United States Patent
Yamashita et al.

(10) Patent No.: US 9,314,872 B2
(45) Date of Patent: Apr. 19, 2016

(54) RECORDING APPARATUS, RECORDING METHOD, AND PATTERN FORMING MEDIUM

(71) Applicants: SONY CORPORATION, Tokyo (JP); SONY DADC CORPORATION, Tokyo (JP)

(72) Inventors: Eiki Yamashita, Kanagawa (JP); Akitoshi Suzuki, Shizuoka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/230,431

(22) Filed: Mar. 31, 2014

(65) Prior Publication Data

US 2014/0302270 A1    Oct. 9, 2014

(30) Foreign Application Priority Data

Apr. 9, 2013   (JP) .................................. 2013-081363

(51) Int. Cl.

| | |
|---|---|
| *G11B 7/24* | (2013.01) |
| *B23K 26/00* | (2014.01) |
| *B23K 26/08* | (2014.01) |
| *B23K 26/03* | (2006.01) |
| *B23K 26/04* | (2014.01) |
| *G11B 7/26* | (2006.01) |

(52) U.S. Cl.
CPC ......... *B23K 26/0087* (2013.01); *B23K 26/0006* (2013.01); *B23K 26/032* (2013.01); *B23K 26/046* (2013.01); *B23K 26/0823* (2013.01); *B23K 26/0876* (2013.01); *G11B 7/261* (2013.01); *B23K 2203/00* (2013.01); *B23K 2203/50* (2015.10); *Y10T 428/21* (2015.01)

(58) Field of Classification Search
CPC .. Y10T 428/21; B23K 26/032; B23K 26/046; B23K 26/0087; B23K 26/0823; B23K 26/0876; G11B 7/261
See application file for complete search history.

(56) References Cited

U.S. PATENT DOCUMENTS

| | | | | |
|---|---|---|---|---|
| 2009/0204983 A1* | 8/2009 | Katsumura | ................... | 720/700 |
| 2014/0267496 A1* | 9/2014 | Kobayashi | ..................... | 347/37 |

FOREIGN PATENT DOCUMENTS

| | | |
|---|---|---|
| JP | 2007-280508 A | 10/2007 |
| JP | 2009-129513 A | 6/2009 |
| JP | 2012-169012 A | 9/2012 |

\* cited by examiner

*Primary Examiner* — Elizabeth Mulvaney
(74) *Attorney, Agent, or Firm* — Sony Corporation

(57) ABSTRACT

A recording apparatus includes a rotation driving unit configured to rotate a recording layer forming medium in which a recording layer is formed, a laser irradiation unit configured to apply laser light to the recording layer of the recording layer forming medium, a first slide mechanism configured to change a position of an irradiation spot of the laser light on the recording layer in a first direction parallel to an in-plane direction of the recording layer, and a recording unit configured to perform a recording operation in which the position of the irradiation spot is changed in the first direction by the first slide mechanism while applying the laser light to the recording layer by the laser irradiation unit and rotating the recording layer forming medium by the rotation driving unit, thereby recording a predetermined pattern in consecutive areas including a central portion of the recording layer.

12 Claims, 20 Drawing Sheets

102···Master
104···Recorded master
105···Pattern-formed master x:0nm、y:0nm (No misalignment)
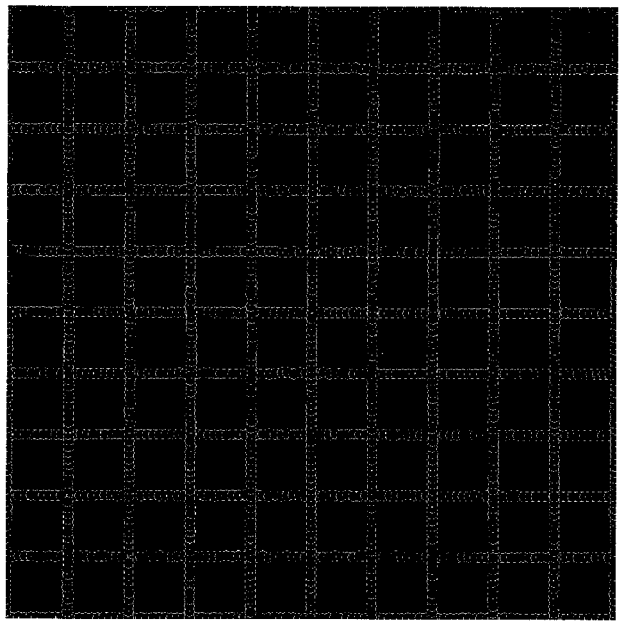
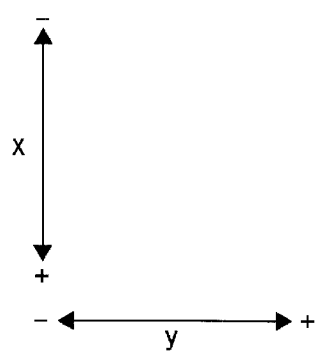
FIG.13 x:-200nm、y:0nm x:-500nm、y:0nm x:+200nm、y:0nm x:+500nm、y:0nm x:0nm、y:50nm x:0nm、y:100nm

RECORDING APPARATUS, RECORDING METHOD, AND PATTERN FORMING MEDIUM

CROSS REFERENCE TO RELATED APPLICATIONS

This application claims the benefit of Japanese Priority Patent Application JP 2013-081363 filed Apr. 9, 2013, the entire contents of which are incorporated herein by reference.

BACKGROUND

The present disclosure relates to a recording apparatus that performs recording in a recording layer forming medium in which a recording layer is formed and to a recording method therefor. Further, the present disclosure relates to a pattern forming medium in which a concavo-convex pattern is formed by rotation recording.

For example, as described in Japanese Patent Application Laid-open No. 2012-169012 or the like, a method of manufacturing an optical disc product in which a pit string including so-called embossed pits or the like is formed has been widely known.

In such a method of manufacturing an optical disc product, an optical disc master in which a concavo-convex pattern corresponding to the pit string is formed is manufactured first. Then, a stamper is formed from the optical disc master and the optical disc products are produced in large amounts using the stamper.

For manufacturing the optical disc master described above, a recording apparatus called a so-called cutting apparatus, a mastering apparatus, or the like, is used.

In such a recording apparatus, a master in which a recording layer serving as a resist layer is formed is rotated and laser light collected by an objective lens is applied. At this time, by gradually changing the relative position between the irradiation position of the laser light and the position of the master, recording is performed over the entire predetermined recording area on the recording layer.

In general, a development (etching) process is performed after such recording and a necessary concavo-convex pattern serving as a pit string (or groove in some cases) is formed by the uneven surface of the resist material.

SUMMARY

Here, the above-mentioned method of manufacturing an optical disc is also a method of manufacturing a product in which a minute concavo-convex pattern is formed, and the method can be also applied to manufacturing of products (e.g., an optical product such as a lens made of resin) other than the optical disc depending on the setting of a recording pattern formed on the master.

However, a specific method of manufacturing products other than the optical disc product by rotation recording is not yet proposed.

In view of the above, it is desirable to provide a favorable method of manufacturing products other than the optical disc product as a pattern forming medium in which a concavo-convex pattern is formed.

According to an embodiment of the present disclosure, there is provided a recording apparatus including a rotation driving unit configured to rotate a recording layer forming medium in which a recording layer is formed, a laser irradiation unit configured to apply laser light to the recording layer of the recording layer forming medium, a first slide mechanism configured to change a position of an irradiation spot of the laser light on the recording layer in a first direction parallel to an in-plane direction of the recording layer, and a recording unit configured to perform a recording operation in which the position of the irradiation spot is changed in the first direction by the first slide mechanism while applying the laser light to the recording layer by the laser irradiation unit and rotating the recording layer forming medium by the rotation driving unit, thereby recording a predetermined pattern in consecutive areas including a central portion of the recording layer.

Because the existing method of manufacturing an optical disc is based on that a center hole is formed in the final optical disc product, a pattern is not formed on the central portion of the product. Therefore, if this method is applied to manufacturing of products other than the optical disc product as it is, the method is limited by the size of the product or the number of divisions if the product is divided into pieces.

On the recording apparatus according to the embodiment of the present disclosure, such limitation is not imposed because recording is performed in consecutive areas including a central portion of the recording layer.

The recording apparatus according to the embodiment of the present disclosure may further include a second slide mechanism configured to change the position of the irradiation spot in a second direction perpendicular to the first direction, the second direction being parallel to the in-plane direction of the recording layer.

The second slide mechanism is capable of changing the position of the irradiation spot in the second direction perpendicular to the first direction being a slide direction during recording.

In the recording apparatus according to the embodiment of the present disclosure, in a case where a direction that is parallel to the in-plane direction of the recording layer and is perpendicular to the first direction is assumed to be a second direction and displacement between a center of rotation of the recording layer forming medium and an original recording position on the recording layer is assumed to be misalignment, the misalignment may be adjusted so that an amount of the misalignment in the first direction is less than one-half of the minimum size of dots recorded on the recoding layer and an amount of the misalignment in the second direction is less than one-quarter of the minimum size of dots.

Accordingly, distortion of the concavo-convex pattern is suppressed within the allowable range.

According to another embodiment of the present disclosure, there is provided a recording method including performing a recording operation in which a position of an irradiation spot of laser light on a recording layer formed in a recording layer forming medium is changed in a first direction parallel to an in-plane direction of the recording layer while applying the laser light to the recording layer and rotating the recording layer forming medium, thereby recording a predetermined pattern in consecutive areas including a central portion of the recording layer.

Also on the recording method according to the embodiment of the present disclosure, the limitation of the size of the product or the number of divisions are not imposed because recording is performed in consecutive areas including a central portion of the recording layer.

In the recording method according to the embodiment of the present disclosure, in a case where a direction that is parallel to the in-plane direction of the recording layer and is perpendicular to the first direction is assumed to be a second direction and displacement between a center of rotation of the recording layer forming medium and an original recording position on the recording layer is assumed to be misalignment, the recording operation is performed after the misalignment is adjusted in the first direction and the second direction.

The adjustment of misalignment suppresses distortion of the concavo-convex pattern.

In the recording method according to the embodiment of the present disclosure, the recording operation may be performed in a state where the misalignment is adjusted so that an amount of the misalignment in the first direction is less than one-half of the minimum size of dots recorded on the recoding layer and an amount of the misalignment in the second direction is less than one-quarter of the minimum size of dots.

Accordingly, distortion of the concavo-convex pattern is suppressed within the allowable range.

In the recording method according to the embodiment of the present disclosure, the misalignment may be adjusted using a reference medium in which a predetermined number of straight lines by which a variation of reflected light can be monitored when the laser light is applied are formed in parallel with each other at regular intervals.

Such a reference medium is suitable for the adjustment of misalignment.

In the recording method according to the embodiment of the present disclosure, the adjustment may be performed by applying the laser light with reproduction power that is less than recording sensitivity of a material of the reference medium in a state where the reference medium is rotated and monitoring return light of the laser light applied with the reproduction power so that the number of the straight lines across which the laser light passes is zero.

Because the laser light passing across the straight lines represents that the misalignment is caused, the misalignment is properly adjusted by making the number of the straight lines across which the laser light passes zero as described above.

In the recording method according to the embodiment of the present disclosure, in a case where a width of the straight line is assumed to be w, a formation pitch of the straight line is assumed to be p, and a diameter of an irradiation spot of the laser light formed on the reference medium is assumed to be LS, a condition that LS is smaller than 2p−w may be satisfied.

Accordingly, the amount of return light changes in the case where the misalignment is caused.

In the recording method according to the embodiment of the present disclosure, a condition that LS is smaller than 2p−2w is satisfied.

Accordingly, the change in the amount of return light in the case where the misalignment is caused is clarified.

According to still another embodiment of the present disclosure, there is provided a pattern forming medium including a concavo-convex pattern based on rotation recording formed in consecutive areas including a central portion of a forming surface of the concavo-convex pattern.

Because the concavo-convex pattern is formed in consecutive areas including the central portion, the limitation of the size of the product or the number of divisions is not imposed.

According to the present disclosure, a pattern is formed in consecutive areas including a central portion, limitation of the size of a product or the number of divisions is not imposed.

Therefore, the present disclosure is suitable for manufacturing products other than the optical disc product as a pattern forming medium in which a concavo-convex pattern is formed.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 13 is a diagram showing the simulation results of a relationship between the misalignment and the distortion of the concavo-convex pattern (in the case of no misalignment);

DETAILED DESCRIPTION OF EMBODIMENTS

Hereinafter, an embodiment of the present disclosure will be described in the following order.
(1. Manufacturing Process of Pattern Transferring Medium)
(2. Configuration of Master Manufacturing Apparatus)
(3. Configuration of Recording Apparatus)
(4. Method of Recording)
(4-1. Recording Method according to Embodiment of Present Disclosure)
(4-2. Regarding Adjustment of Misalignment)
(4-3. Regarding Allowable Amount of Misalignment)
(5. Summary)
(6. Modified Example)
(7. Present Disclosure)

1. Manufacturing Process of Pattern Transferring Medium

A manufacturing process of a replicated medium 108 serving as a pattern forming medium according to an embodiment of the present disclosure will be described first.

The replicated medium 108 manufactured through the manufacturing process is, for example, a pattern forming medium, and a minute concavo-convex pattern having a size of the order of nm (nanometer) is formed on a surface of the pattern forming medium. The replicated medium 108 is replicated (pattern-transferred) based on a master 102 to be described later and thus is manufactured. Specifically, an example in which a lens made of resin (optical product) is manufactured as the replicated medium 108 will be described in the following.

The manufacturing process according to this embodiment can be largely divided into a master producing process, a recording process, a development process, a mold fabrication process, and a replication process.

In the master producing process, the master 102 being the source of a stamper 106 to be described later used to produce the replicated medium 108 in large quantities is produced. In the recording process, laser light is applied to the master 102 produced in the master producing process to perform recording. In the development process, development processing is performed on a recorded master 104 recorded in the recording process to form a concavo-convex pattern on the master 102. In the mold fabrication process, the stamper 106 is produced. In the replication process, the stamper 106 is used to produce the replicated medium 108.

Figure 1A:
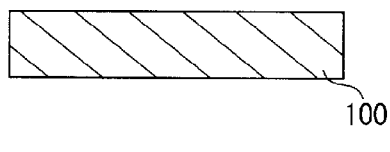
FIGS. 1A, 1B, 1C, 1D, 1E, 1F, 1G, 1H, and 1J are each a diagram showing a manufacturing process of a pattern forming medium according to an embodiment of the present disclosure.

FIGS. 1A, 1B, 1C, 1D, 1E, 1F, 1G, 1H, and 1J are each a diagram showing a manufacturing process of a pattern forming medium according to this embodiment. FIG. 1A shows a master forming substrate 100 constituting the master 102. As the master forming substrate 100, a disc-shaped substrate made of silicon is used, for example. First, on the master forming substrate 100, a resist layer 101 formed of a resist material is uniformly formed as a recording layer by a sputtering method (master producing process, see FIG. 1B). In this way, the master 102 is produced.

In this example, as a mastering process for the master 102, mastering of a PTM (Phase Transition Mastering) process using an inorganic resist material is performed. Corresponding to this, an incomplete oxide of transition metal is used for the material of the resist layer 101. Specific example of the transition metal include Ti, V, Cr, Mn, Fe, Nb, Cu, Ni, Co, Mo, Ta, W, Zr, Ru, and Ag.

By using an inorganic resist material for the resist layer 101, it is possible to form a finer mark than the diameter of the irradiation spot of laser light as PTM recording.

Figure 1B:
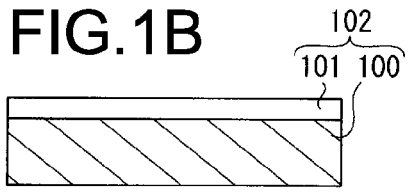
Figure 1C:
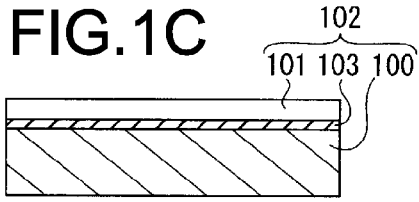

Moreover, in order to improve the exposure sensitivity of the resist layer 101, the master 102 may be produced by forming a predetermined intermediate layer 103 between the master forming substrate 100 and the resist layer 101 (see FIG. 1C). In any case, the resist layer 101 only has to be formed so as to be exposed to the outside on the upper layer of the master forming substrate 100 so that the resist layer 101 can be exposed to light through the irradiation of laser light during exposure.

It should be noted that the resist layer 101 may be deposited by sputtering such as DC sputtering, RF sputtering, and magnetron sputtering.

Figure 1D:
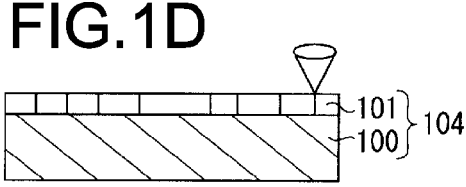

Next, as shown in FIG. 1D, the resist layer 101 of the master 102 is selectively exposed by application of laser light, thereby forming a mark (recording process). In this way, the recorded master 104 is produced. At this time, the application of laser light is performed while rotating the master 102.

It should be noted that the recording process is performed using a recording apparatus 3 to be described later.

Figure 1E:
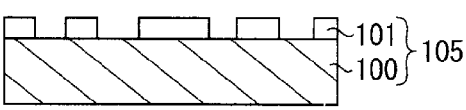

Next, as shown in FIG. 1E, the resist layer 101 is developed, thereby producing a pattern-formed master 105 in which a concavo-convex pattern is formed (development process). In the development process, specific examples of the developing method include a dipping method with immersion and a method of applying a liquid medicine to the recorded master 104 rotated by a spinner.

As a developing solution, an organic alkaline developing solution such as a TMAH (tetramethylammonium hydroxide)-based material, or an inorganic alkaline developing solution such as a KOH-based, NaOH-based, or phosphoric acid-based material is used.

Figure 1F:
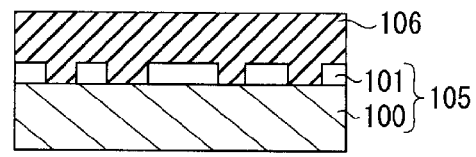
Figure 1G:
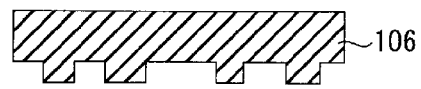

Next, as shown in FIG. 1F, after the pattern-formed master 105 is washed with water, the stamper 106 is produced in an electroforming tank (mold fabrication process). Next, the stamper 106 is removed from the pattern-formed master 105. Thus, the stamper 106 for molding to which the concavo-convex pattern of the pattern-formed master 105 is transferred is obtained (FIG. 1G). In this case, as the material of the stamper 106, Ni is used, for example.

Here, in order to make the removal of the stamper 106 from the pattern-formed master 105 easy, it is possible to perform a demolding process on the surface of the pattern-formed master 105 shown in FIG. 1E after the pattern-formed master 105 is produced. It is possible to improve the demolding properties by performing any one of the following processes on the pattern-formed master 105.

1) Immersing in an alkaline solution heated to 40 to 60° C. for several minutes
2) Electrolytically oxidizing while immersing in an electrolytic alkaline solution heated to 40 to 60° C. for several minutes
3) Forming an oxidized film using RIE or the like
4) Deposit a metal oxide film using a deposition apparatus Alternatively, it is possible to improve the demolding properties also by selecting a material having a composition ratio of oxygen, which is liable to be removed from the stamper 106, as the inorganic resist material in advance.

It should be noted that after the stamper 106 is produced, the pattern-formed master 105 can be used to repeatedly produce a desired number of the stampers 106 as necessary by washing the pattern-formed master 105 with water and storing it in a dry state.

Figure 1H:
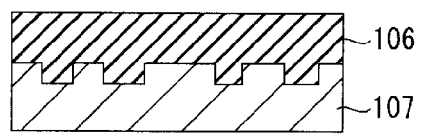

Next, a resin replication substrate 107 formed of thermoplastic resin such as polycarbonate is molded by an injection molding method using the stamper 106 (see FIG. 1H).

Figure 1J:

After that, the stamper 106 is removed, and thus the replicated medium 108 in which a desired concavo-convex pattern is formed is obtained (replication process, see FIG. 1J).

2. Configuration of Master Manufacturing Apparatus

Figure 2:
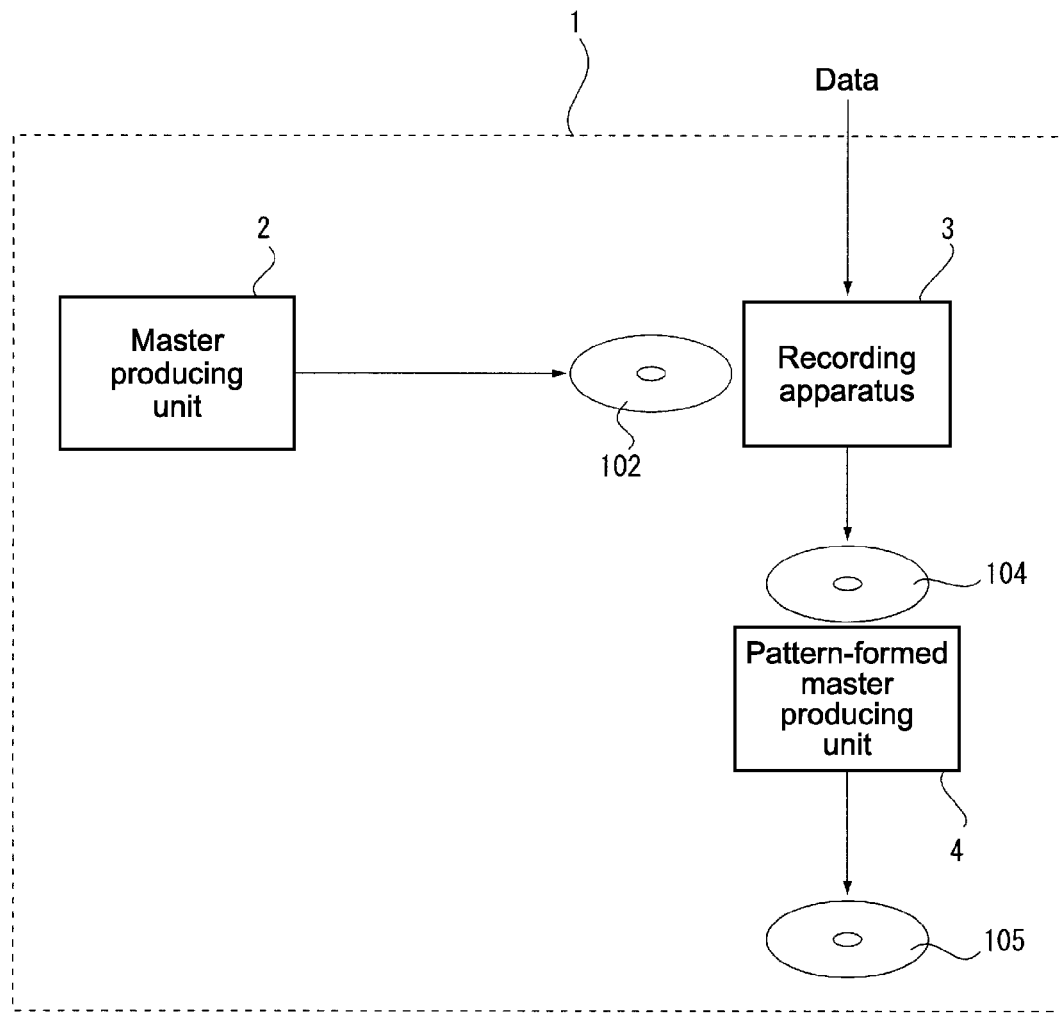
FIG. 2 is a conceptual diagram showing the internal configuration of a master manufacturing apparatus.

FIG. 2 shows a configuration example of a master manufacturing apparatus 1 that realizes the master producing process, the recording process, and the development process described above.

In FIG. 2, the master manufacturing apparatus 1 includes a master producing unit 2, the recording apparatus 3, and a pattern-formed master producing unit 4.

The master producing unit 2 produces the master 102 through the process of forming the resist layer shown in FIG. 1B or FIG. 1C.

The master forming substrate 100 is loaded from the outside into the master producing unit 2. The master producing unit 2 deposits a layer of the inorganic resist material serving as the resist layer 101 on the master forming substrate 100 by, for example, sputtering.

It should be noted that as shown in FIG. 1C, in the case where the intermediate layer 103 is formed, after a layer of the material serving as the intermediate layer 103 is deposited on the master forming substrate 100, the resist layer 101 is deposited on the upper layer thereof.

The master 102 produced by the master producing unit 2 is moved to the recording apparatus 3. It should be noted that although illustration is omitted, the master 102 is delivered from the master producing unit 2 to the recording apparatus 3 by a handling robot provided in the master manufacturing apparatus 1.

The recording apparatus 3 forms a pattern based on input data by applying laser light to the resist layer 101 of the master 102.

In this example, physical properties of the resist layer 101 are changed due to heat generated by the application of laser light to the resist layer 101, thereby forming a mark.

It should be noted that in this example, the pattern-formed master 105 in which information is recorded with combinations of pits and lands having different lengths like a master of an optical disc is not produced but the pattern-formed master 105 (replicated medium 108) in which a predetermined concavo-convex pattern serving as a sort of marking is formed is produced. Therefore, as input data to the recording apparatus 3, image data representing a marking to be formed is used.

The image data is expressed by a rectangular coordinate system. However, recording in the master 102 is performed by moving the master 102 in a radial direction while rotating the master 102, i.e., by so-called rotation recording. Specifically, in this example, laser light is applied to the master 102 so that the laser light follows a locus of a spiral shape on the master 102, thereby performing recording. Therefore, in the case where the image data expressed by a rectangular coordinate system is used as it is, it is difficult to properly form the pattern represented by the image data. In this regard, the recording apparatus 3 performs polar coordinate conversion (r/θ conversion) on the image data expressed by a rectangular coordinate system. Thereafter, the data expressed by a polar coordinate system is sorted by a radial component, a mark (dot) is formed based on the sorted data. Accordingly, in rotation recording, a pattern based on the image data expressed by a rectangular coordinate system can be formed on the master 102 properly.

It should be noted that the internal configuration of the recording apparatus 3 will be described later.

The pattern-formed master producing unit 4 performs the development process shown in FIG. 1E on the recorded master 104 in which recording is performed by the recording apparatus 3, thereby producing the pattern-formed master 105. Specifically, after the recorded master 104 is immersed in a developing solution, the immersed recorded master 104 is washed, thereby producing the pattern-formed master 105.

With the development process, a trench having a concave shape is formed in a portion exposed with laser light.

3. Configuration of Recording Apparatus

Figure 3:
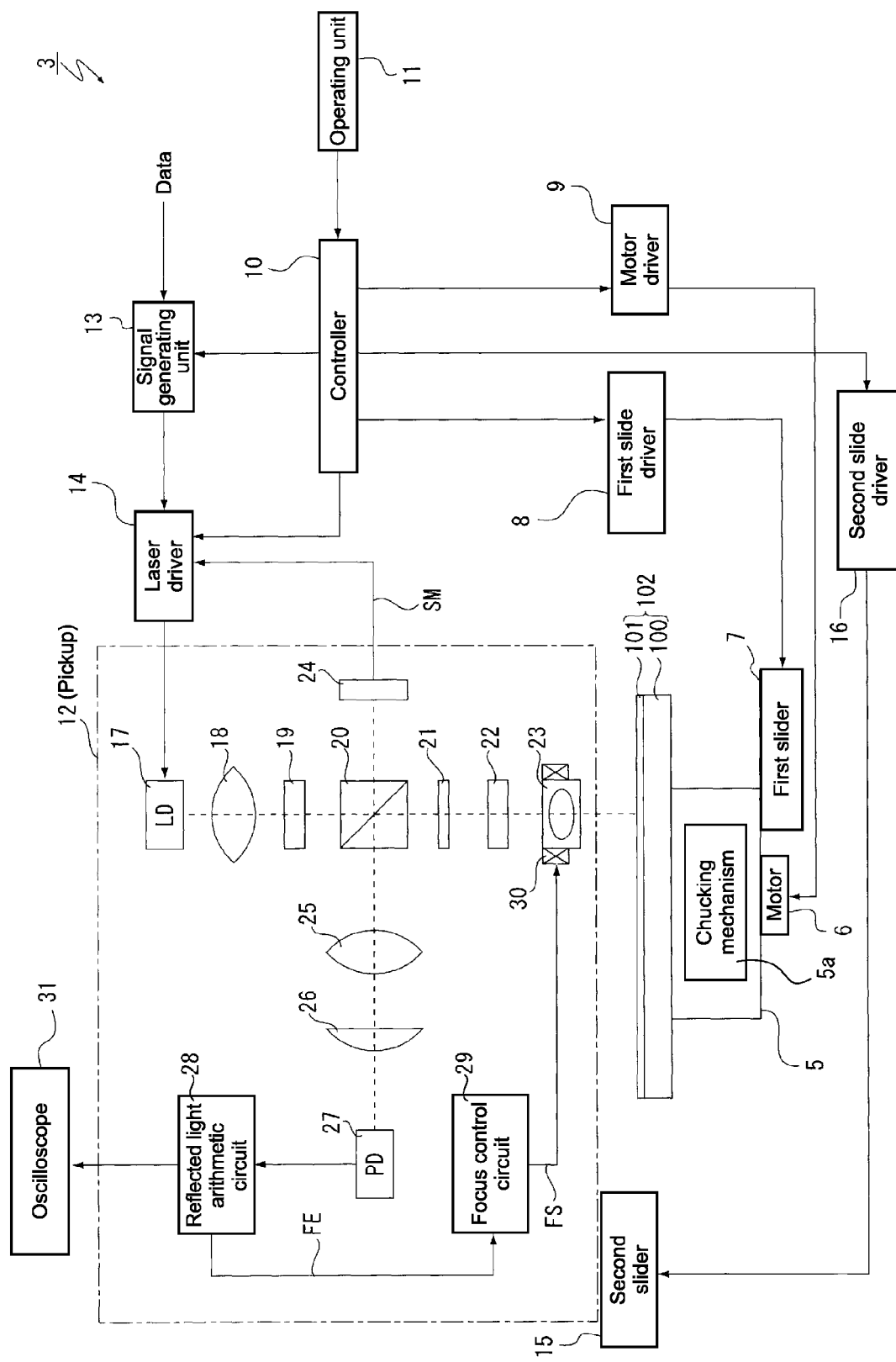
FIG. 3 is a diagram showing the internal configuration of a recording apparatus.

FIG. 3 shows an example of the internal configuration of the recording apparatus 3. The recording apparatus 3 includes a rotating table 5, a motor 6, a first slider 7, a first slide driver 8, a motor driver 9, a controller 10, an operating unit 11, a pickup 12, a signal generating unit 13, a laser driver 14, a second slider 15, and a second slide driver 16.

On the rotating table 5, a loading surface for loading the master 102 is formed. In the rotating table 5, a chucking mechanism 5a configured to perform a chucking operation for fixing the master 102 to the loading surface is provided.

The motor 6 rotates the rotating table 5 on which the master 102 is loaded based on a drive signal from the motor driver 9.

A control signal is supplied from the controller 10 to the motor driver 9, and starting and stopping of rotation of the motor 6 and the rotation rate are controlled based on the control signal.

The first slider 7 holds the whole of the rotating table 5 on which the master 102 is loaded and the motor 6 so as to be capable of transporting them in the first direction. Here, the first direction is a radial direction of the master 102, that is, direction parallel to the in-plane direction of the resist layer 101 (radial direction in this case).

With the above-mentioned configuration, it is possible to move the master 102 in the first direction by the first slider 7 while rotary driving the master 102 by the motor 6, and thus the above-mentioned rotation recording can be performed.

The first slider 7 is driven based on a drive signal from the first slide driver 8.

The pickup 12 includes a laser 17, a collimator lens 18, an anamorphic prism 19, a polarization beam splitter 20, a λ/4 wavelength plate 21, a beam expander 22, an objective lens 23, a monitor detector 24, a collective lens 25, a cylindrical lens 26, a photodetector 27, a reflected light arithmetic circuit 28, a focus control circuit 29, and an actuator 30.

In the laser 17, a semiconductor laser is used. The wavelength of the semiconductor laser is set to about 405 nm, for example.

The laser light emitted from the laser 17 is made to be parallel light by the collimator lens 18. After that, the sport shape of the laser light is deformed into a circular shape in the anamorphic prism 19, for example, and is guided to the polarization beam splitter 20.

Then, the component polarized light transmitted through the polarization beam splitter 20 is guided to the objective lens 23 through the λ/4 wavelength plate 21 and the beam expander 22, is collected by the objective lens 23, and is applied to the master 102.

The laser light applied to the master 102 through the objective lens 23 as described above is focused on the resist layer 101 of the master 102. The resist layer 101 absorbs the laser light, and thus a portion heated to a high temperature in the vicinity of the center of the irradiation portion is polycrystallized. By the operation, a mark is formed on the resist layer 101.

The laser light reflected on the polarization beam splitter 20 is applied to the monitor detector 24 configured to monitor laser power. The monitor detector 24 outputs a light intensity monitor signal SM corresponding to the amount of received laser light.

On the other hand, return light of the laser light applied to the master 102 is transmitted through the objective lens 23, the beam expander 22, and the λ/4 wavelength plate 21, and enters the polarization beam splitter 20. In this case, the polarization surface of the return light is rotated by 90 degrees by being transmitted through the λ/4 wavelength plate 21 two times in the forward path and the backward path, and the return light is reflected on the polarization beam splitter 20. The return light reflected on the polarization beam splitter 20 is received by a light-receiving surface of the photodetector 27 through the collective lens 25 and the cylindrical lens 26.

The light-receiving surface of the photodetector 27 is divided into four light-receiving surfaces. The photodetector 27 supplies a current signal obtained depending on the amount of received light on the respective light-receiving surface to the reflected light arithmetic circuit 28.

The reflected light arithmetic circuit 28 converts the current signal from the divided light-receiving surface into a voltage signal, generates a focus error signal FE by performing arithmetic processing based on an astigmatic method, and supplies the focus error signal FE to the focus control circuit 29.

Moreover, the reflected light arithmetic circuit 28 adds the voltage signal of the amount of received light on the divided light-receiving surface, generates a detection signal of reflected light amount showing the reflected light level, and supplies the detection signal to an external oscilloscope 31. The oscilloscope 31 is connected to the recording apparatus 3 for an operator to monitor the waveform of return light when adjusting the misalignment using a reference medium 102R to be described later.

The focus control circuit 29 generates a servo drive signal FS of the actuator 30 that holds the objective lens 23 so as to be capable of moving the objective lens 23 in a focus direction (direction of movement toward and away from the master 102), based on the focus error signal FE. Then, the actuator 30 drives the objective lens 23 in the focus direction based on the servo drive signal FS, thereby performing a focus servo.

The signal generating unit 13 receives image data as input data from the outside, performs polar coordinate conversion and sort processing, and generates a recoding signal based on the sorted data.

Specifically, polar coordinate conversion is performed on the image data input from the outside first. Next, the data subjected to polar coordinate conversion is sorted based on a radial component and a declination component. At this time, the data is sorted based on the radial component preferentially. Specifically, the sorted data is arranged in the order of a small radial component, and the data having the same radial component is arranged in the order of a small declination component. Next, a recoding signal is generated based on the sorted data.

It should be noted that in the polar coordinate conversion, the input image data is sampled in units of dot having a predetermined size. The units of dot may be the same as the pixel size of the image data in some cases. In this case, there is no need to perform the sampling.

In any case, in order to perform recording in this case, the dot having a predetermined size obtained by the sampling or the like is used as the minimum unit, and a pattern serving as a marking is formed on the resist layer 101. In other words, the pattern serving as a marking is expressed by a group of the dot.

Hereinafter, the minimum unit of the dot will be described as "minimum dot."

The recording signal generated by the signal generating unit 13 represents the existence or non-existence of dot in units of the minimum dot (that is, existence or non-existence of the formed mark).

The laser driver 14 drives the laser 17 to emit light in the pickup 12 based on the recording signal generated by the signal generating unit 13.

It should be noted that the light intensity monitor signal SM from the monitor detector 24 is supplied to the laser driver 14. The laser driver 14 is capable of controlling the laser light emission based on the results obtained by comparing the light intensity monitor signal SM with a reference value.

The second slider 15 holds the pickup 12 so as to be capable of sliding the pickup 12 in the second direction.

Here, the second direction is a direction parallel to the in-plane direction of the resist layer 101 in the state where the master 102 is loaded on the rotating table 5, which is perpendicular to the first direction being the slide direction of the first slider 7.

Figure 4:
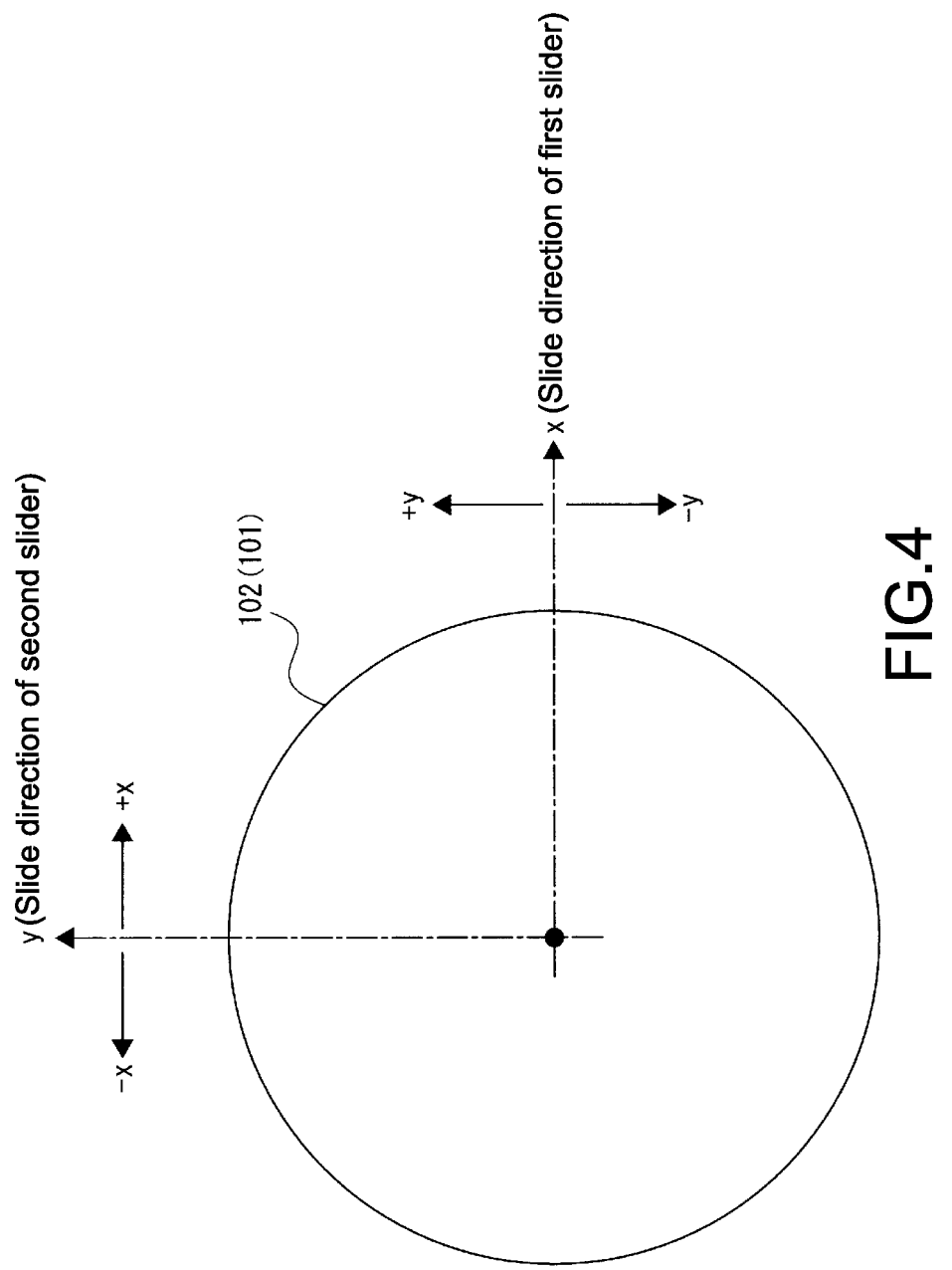
FIG. 4 is a diagram showing a relationship between a first direction and a second direction.

FIG. 4 shows the relationships between the first direction, the second direction, and the master 102 (resist layer 101) for confirmation.

In FIG. 4, the direction shown as "Slide direction of first slider" is the first direction, and the direction shown as "Slide direction of second slider" is the second direction.

It should be noted that as shown in FIG. 4, the first direction is described also as "x-direction" and the second direction is described also as "y-direction" in the following.

In FIG. 3, the second slider 15 is driven by a drive signal from the second slide driver 16. The second slide driver 16 drives the second slider 15 by the drive signal generated based on the control signal from the controller 10.

Here, the second slider 15 is used during the adjustment of the misalignment to be described later, and is not used during recording. During recording, the second slider 15 is fixed at the original position (position set so that the center of the irradiation spot of laser light corresponds to the center of rotation of the motor 6 in designing).

The controller 10 includes, for example, a microcomputer, and controls the entire recording apparatus 3. For example, the controller 10 controls the recording operation to the master 102 by controlling the first slide driver 8 or the motor driver 9 or starting and stopping of the operation with respect to the signal generating unit 13. Moreover, the controller 10 can perform power control of laser light by instructing the laser driver 14.

Moreover, the operating unit 11 is provided for the controller 10. The controller 10 can control the first slide driver 8, the motor driver 9, the second slide driver 16, and the laser driver 14 in response to operation input information from the operating unit 11. Specifically, the operating unit 11 can perform the power control of the first slider 7, the second slider 15, the motor 6, and the power control of the laser driver 14 depending on the operation performed by an operator on the operating unit 11.

4. Method of Recording (4-1. Recording Method According to Embodiment of Present Disclosure)

Here, in this embodiment, not an optical disc in which information is recorded as the replicated medium 108 but a pattern forming medium in which a concavo-convex pattern is formed as a predetermined marking is manufactured.

Because the existing process of manufacturing an optical disc is based on that a center hole is formed in the final optical disc product, a pattern is not formed on the central portion of the product. Therefore, if this process is applied to manufacturing of products other than the optical disc product as it is, the process is limited by the size of the product or the number of divisions if the replicated medium 108 is divided into pieces and is commercialized.

In this regard, in this embodiment, a master in which a center hole is not formed is used as the master 102 and a pattern is formed in consecutive areas including the central portion of the resist layer 101 in the master 102.

Specifically, by starting the rotation recording in the state where the first slider 7 and the second slider 15 are located at the original positions (i.e., state where the center of rotation is substantially aligned with the center of the irradiation spot of laser light), the pattern is formed in the consecutive areas including the central portion of the resist layer 101.

Figure 5:
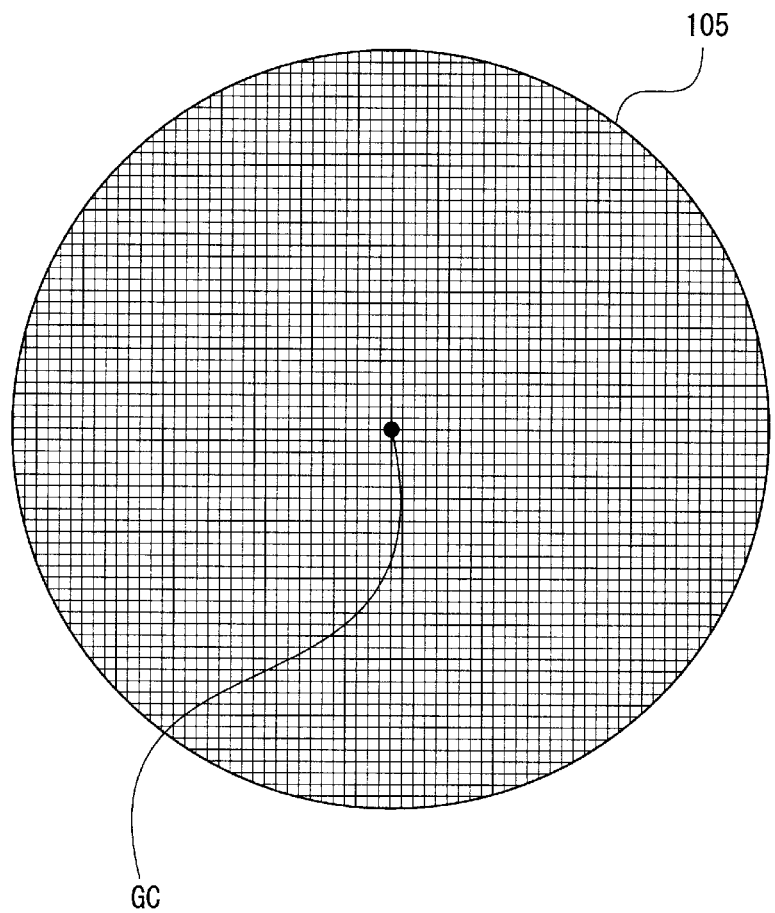
FIG. 5 is a diagram schematically showing a concavo-convex pattern formed in a pattern forming medium obtained by applying a recording method according to an embodiment of the present disclosure.

FIG. 5 schematically shows a concavo-convex pattern formed in the pattern-formed master 105 obtained by applying the recording method according to this embodiment.

As shown in FIG. 5, in the pattern-formed master 105, a concavo-convex pattern is formed in consecutive areas including a center GS of the resist layer 101.

It should be noted that although FIG. 5 shows an example in which the formed concavo-convex pattern is a lattice-shaped pattern, the specific shape of the pattern is not limited thereto.

It should be noted that even if the rotation recording is started in the state where the center of rotation is substantially aligned with the center of the irradiation spot of laser light as described above, it may be impossible to start recording from the center GS of the resist layer 101 in the case where the center GS of the resist layer 101 is not aligned with the center of the irradiation spot of laser light. However, even if the center GS is not aligned with the recording start position as described above, a pattern can be formed in "the consecutive areas including the center GS" (because of rotation recording).

In the existing manufacturing process of an optical disc, because recording is started from the position largely displaced from the center of rotation toward the outer periphery side, an area in which a pattern is formed has a circular shape. Therefore, in the case where the existing manufacturing method of an optical disc is used as it is, it may be impossible to form the pattern in the "consecutive areas including the central portion."

In this embodiment, as shown in FIG. 5, by forming the pattern in the consecutive areas including the center portion, it is possible to manufacture a product in which a concavo-convex pattern is formed in the consecutive areas including the center portion in the case of the replicated medium 108, similarly.

Accordingly, for manufacturing products in which a predetermined concavo-convex is formed other than the optical disc product, the limitation of the size of the product or the number of divisions is not imposed.

(4-2. Regarding Adjustment of Misalignment)

It should be noted that because the above description is based on that the center of the irradiation spot of laser light is aligned with the center of rotation with sufficient precision, if there is a large displacement between them, it may be impossible to form a pattern in consecutive areas including the center GS. Moreover, if there is a large displacement between the center of the irradiation spot of laser light and the center of rotation, it may be impossible to form an intended pattern properly by the rotation recording. Specifically, distortion is produced on the pattern.

In this regard, in this embodiment, the displacement between the center of the irradiation spot of laser light and the center of rotation is adjusted. It should be noted that in the following, the displacement between the center of the irradiation spot of laser light and the center of rotation is described as "misalignment."

The adjustment of misalignment in this example is performed in the same way as that described in Japanese Patent Application Laid-open No. 2009-129513.

Hereinafter, the method of adjusting the misalignment in this example will be described with reference to FIGS. 6 to 12.

Figure 6:
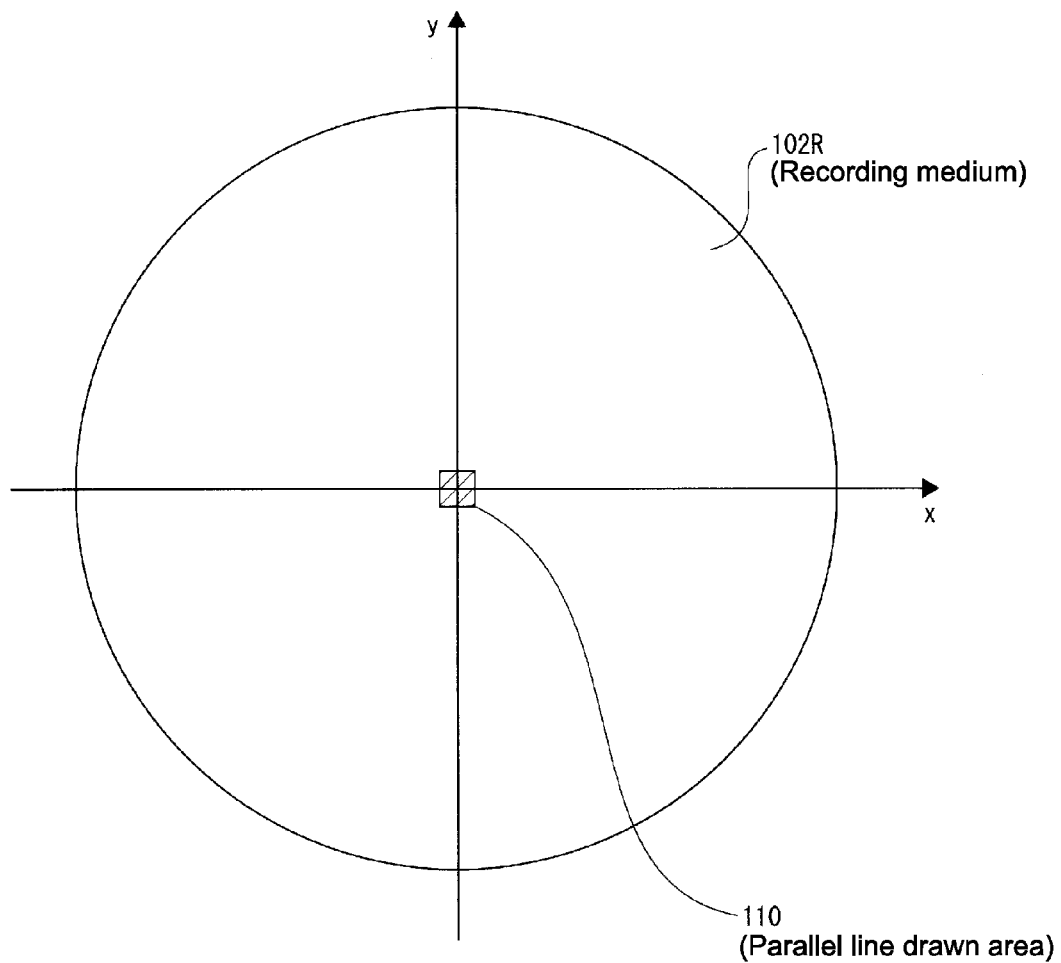
FIG. 6 is an explanatory diagram for a reference medium according to an embodiment of the present disclosure.

FIG. 6 shows the reference medium 102R used for the adjustment of misalignment in this example.

An area including the central portion of the reference medium 102R is referred to as a parallel line drawn area 110.

Figure 7:
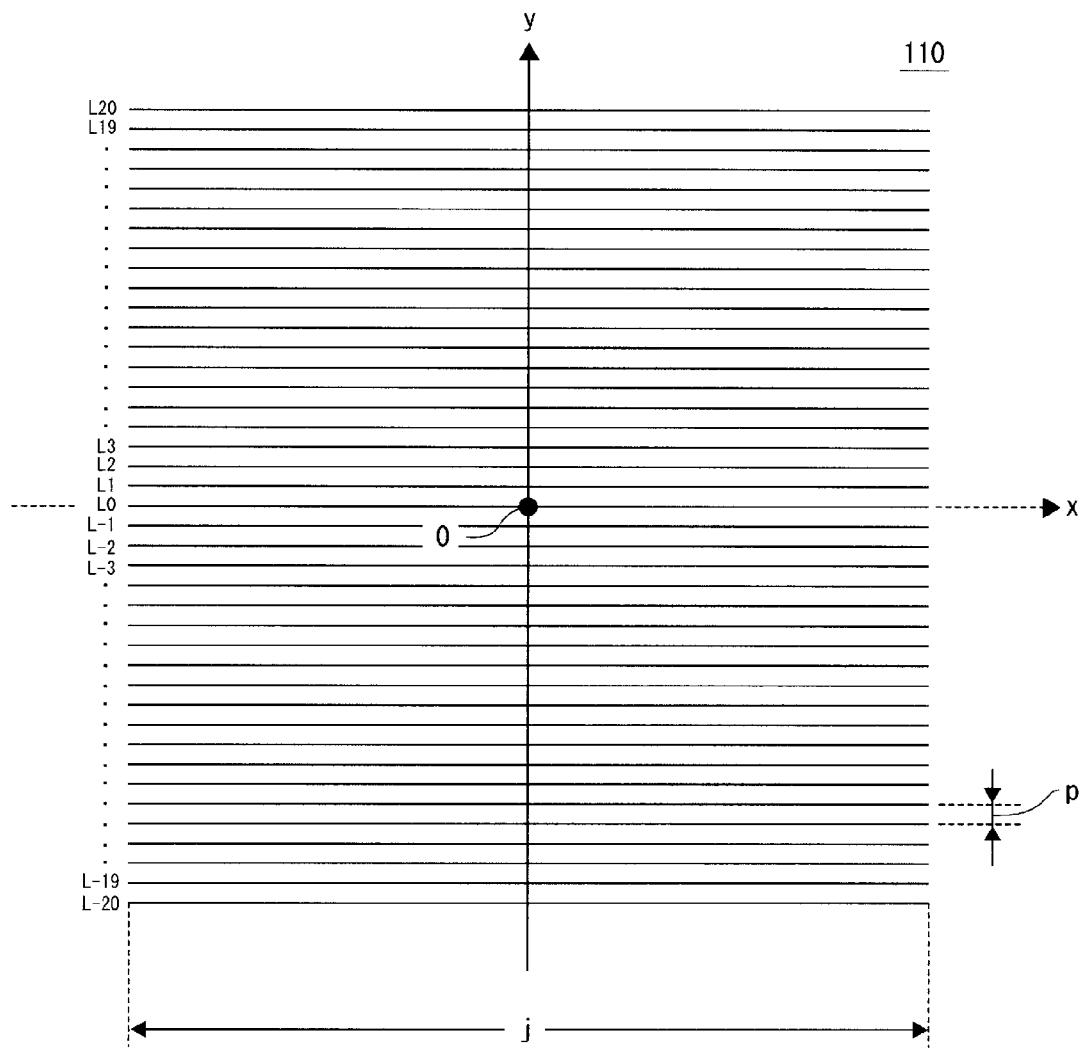
FIG. 7 is an explanatory diagram for a parallel line drawn area of the reference medium according to the embodiment of the present disclosure.

FIG. 7 shows the enlarged parallel line drawn area 110

Here, as an example, a state where 41 straight lines that are represented by straight lines L (L20, L19, . . . , L0, L−1, L−2, . . . , L−20) are formed is shown. This is only an example for illustrative purposes, and the number of straight lines L is not limited thereto.

The straight lines L (L20, . . . , L−20) are parallel lines each having a length (length in a longitudinal direction) j. A pitch p being a formation pitch of the respective straight lines L is constant.

In this example, the parallel line drawn area 110 is a square area having the length j.

Therefore, the number of straight lines L is set so that the parallel line drawn area 110 is a square area based on the relationship between a width w thereof (length in a short direction) and the length j.

For performing the adjustment of misalignment, the reference medium 102R in which the parallel line drawn area 110 is formed is produced by the recording apparatus 3.

Specifically, the reference medium 102R is produced by preparing a master obtained by depositing an inorganic resist film on a substrate made of, for example, silicon, and forming the plurality of straight lines L as the parallel line drawn area 110 in the master by the recording apparatus 3. Also in this case, a resist film including an inorganic resist material for PTM recording is used.

The straight lines L are recorded by displacing the master in the first direction by the first slider 7 (at this time, the master is not rotated).

It should be noted that a development process may be applied to the recorded master after the straight lines L are formed (exposed) by the recording apparatus 3. Moreover, it is also possible to deposit a reflection film on the muster subjected to the development process or the recorded master.

The reference medium 102R produced as described above, is used to perform the adjustment of misalignment.

Figure 8:
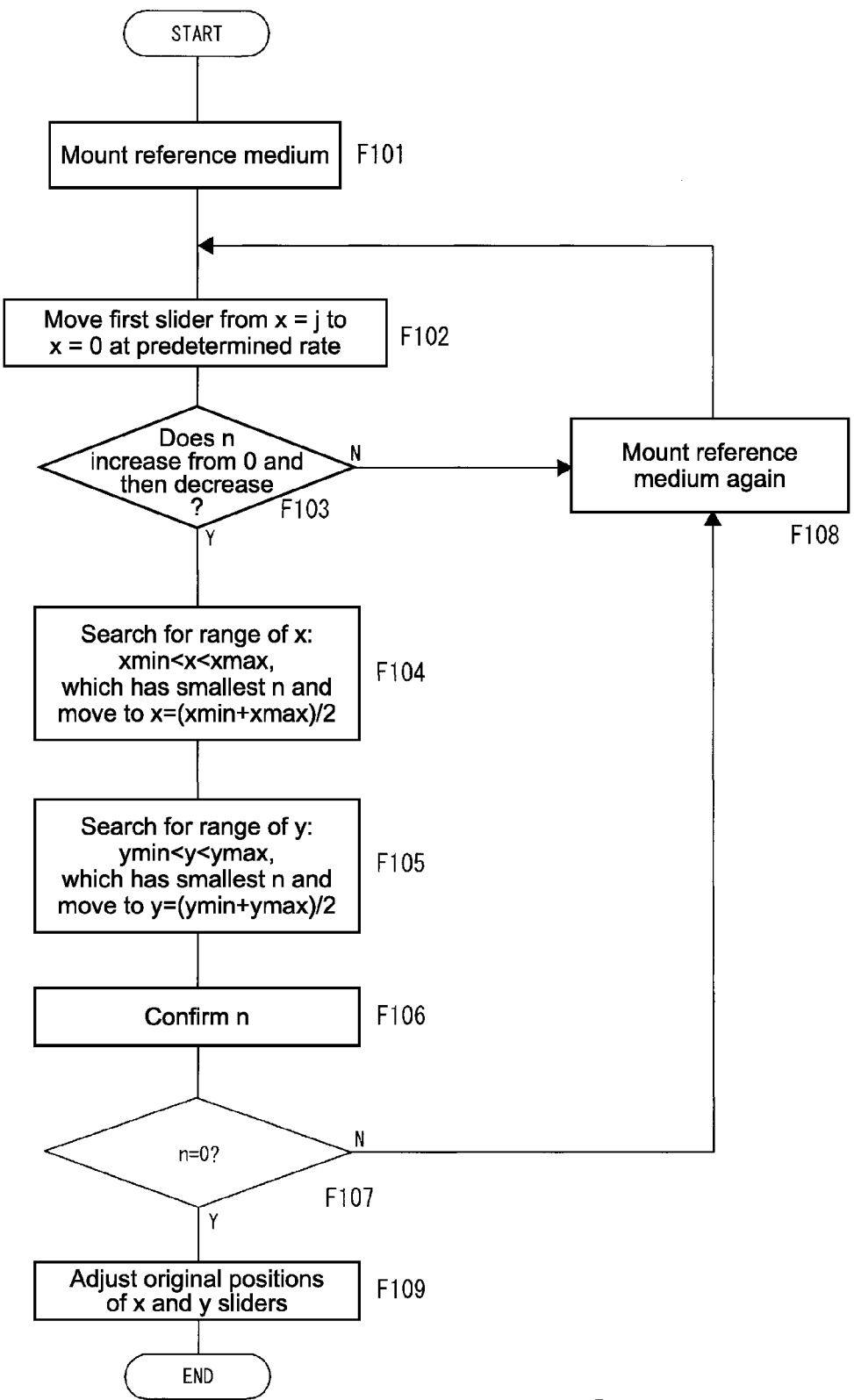
FIG. 8 is a flowchart showing a procedure of adjusting misalignment according to an embodiment of the present disclosure.

FIG. 8 shows a procedure of adjusting the misalignment. Hereinafter, a specific method of adjusting the misalignment will be described with reference to FIGS. 9 and 10 along the steps shown in FIG. 8.

First, the coordinate on the xy plane will be defined as follows.

The origin of the coordinate of the xy plane is set based on the original position of the first slider 7 and the original position of the second slider 15. Specifically, the position of the irradiation spot of laser light on the xy plane in the case where the first slider 7 is located at the original position and the second slider 15 is located at the original position is an origin O, i.e., (x, y)=(0, 0).

Then, corresponding to this, the coordinate of the center of rotation of the reference medium 102R rotated by the motor 6 is (a, b), i.e., (x, y)=(a, b). Specifically, "a" represents the amount of displacement in the x-direction (the amount of misalignment in the x-direction) between the central position of the irradiation spot of laser light and the center of rotation in the case where the first slider 7 is located at the original position, and "b" represents the amount of displacement in the y-direction (the amount of misalignment in the y-direction) between the central position of the irradiation spot of laser light and the center of rotation in the case where the second slider 15 is located at the original position.

It should be noted that in the following, the center of rotation of the reference medium 102R rotated by the motor 6 is described as "rotation center RC."

In FIG. 8, first, the reference medium 102R is mounted on the recording apparatus 3 in step F101. Specifically, the reference medium 102R is loaded on the rotating table 5.

After the reference medium 102R is loaded, laser light is focused on the surface of the reference medium 102R by reproduction power (e.g., about 0.5 mW), the motor 6 is rotated at a predetermined rotation rate (of about 600 rpm, for example), and the intensity of reflected light from the surface of the reference medium 102R is monitored by the oscilloscope 31.

It should be noted that the reproduction power represents laser power that is less than recording sensitivity of a material (resist material in this case) on the reference medium 102R.

Then, the slide position of the first slider 7 (position in the x-direction) and the slide position of the second slider 15 (position in the y-direction) are moved based on information on the intensity of reflected light (amount of reflected light) monitored by the oscilloscope 31 to find out the waveform of return light from the parallel line drawn area 110 formed on the central portion of the reference medium 102R.

The exposed portion, i.e., portion in which the straight lines L are formed, has a reduced reflectance because it is significantly affected by a light scatter than the unexposed portion surrounding the exposed portion, i.e., mirror portion. Using the characteristics, it is possible to find out the parallel line drawn area 110.

In step F102, the movement rate of the first slider 7 is set to a predetermined rate (e.g., about 100 μm/s) while rotating the motor 6 at the predetermined rotation rate, and the first slider 7 is moved from the coordinate where x=J to x=0. Then, the waveform of return light at this time is monitored by the oscilloscope 31.

Then, the change of the number of straight lines L across which laser light passes (hereinafter, referred to as "intersection number n") depending on the slide position of the first slider 7 is monitored. Specifically, the tendency of the intersection number n to increase from 0 and then decrease is obtained.

Figure 9:
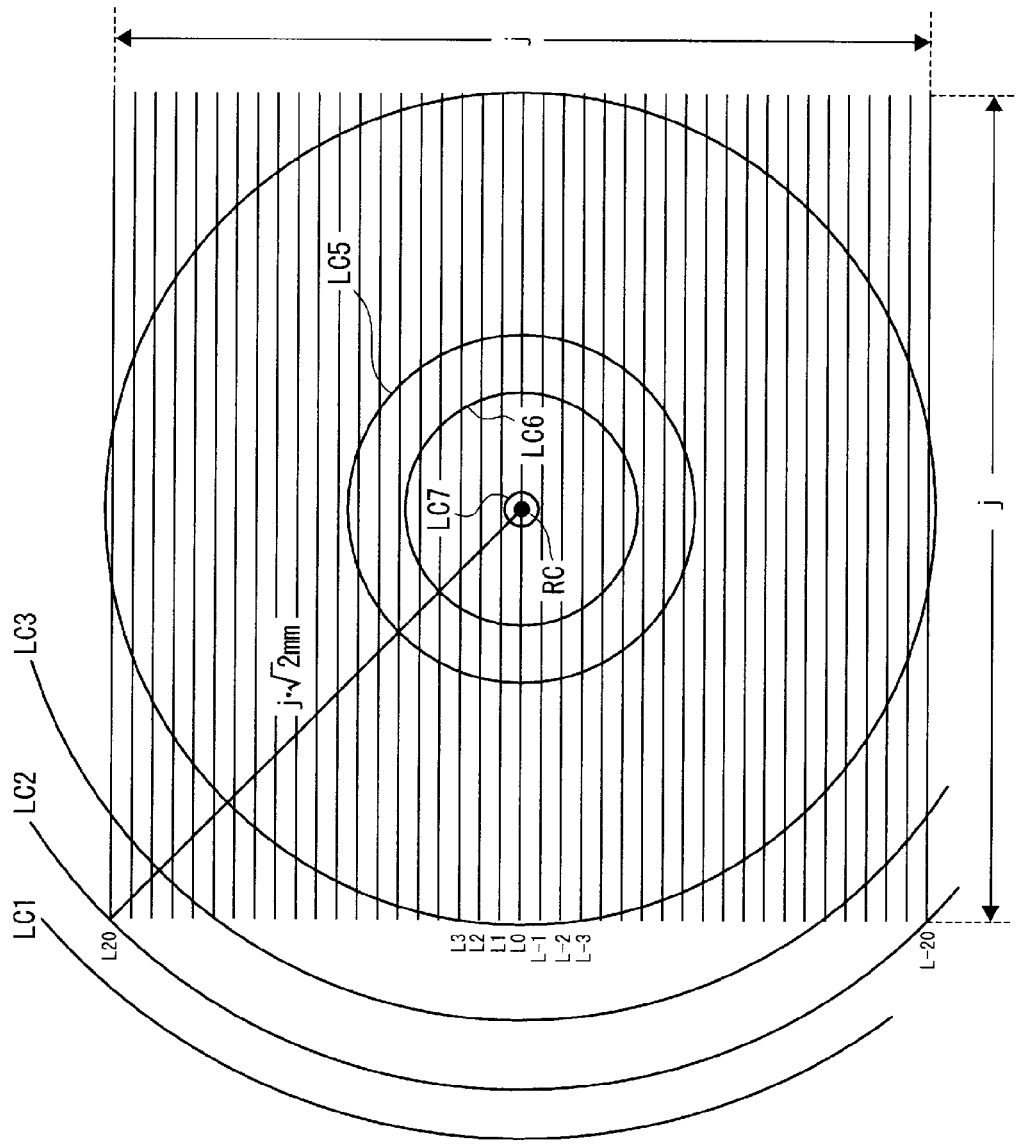
FIG. 9 is an explanatory diagram for a state of loci of a beam spot intersected with straight lines.

It should be noted that although the details thereof is described also in Japanese Patent Application Laid-open No. 2009-129513, the principle thereof is shown in FIG. 9 for confirmation. First, as the irradiation position of laser light is moved in a relatively wide range, the amount of misalignment between the laser light and the rotation center RC decreases and then increases from a certain point. At this time, a spot movement locus LC1 shown in FIG. 9 is in a state where the laser light does not pass through the straight lines L (intersection number=0). A spot movement locus LC2 is obtained when the irradiation position is moved from the state and the amount of misalignment is j·√2. From the spot movement locus LC2, the laser light starts to pass through the straight lines L (n=4 in this state). Then, as the irradiation position is moved and the amount of misalignment further decreases, the intersection number n increases and then decreases as shown in spot movement locus LC3 to LC7 in FIG. 9.

It should be noted that although an example in which the amount of misalignment is decreased in the x-direction and the y-direction is shown in FIG. 9, even if the amount of misalignment is decreased only in the x-direction, the intersection number n increases and then decreases similarly.

In step F103, whether or not the intersection number n increases from 0 and then decreases is determined.

Here, because the adjustment is not yet performed at the time of step F103 and the misalignment in the y-direction may occur, the intersection number n is not necessarily 0 even in the case where the irradiation position is in the vicinity of the coordinate where x=0.

Moreover, it may be difficult to monitor the state where the intersection number n increases from 0 and then decreases in some cases even if the first slider 7 is moved from the coordinate where x=j to x=0. In such a case, the process proceeds from step F103 to step F108, the reference medium 102R is mounted again, and the process starts from step F102.

On the other hand, in the case where the state where the intersection number n increases from 0 and then decreases can be monitored, the process proceeds from step F103 to F104, and a procedure for adjusting the misalignment actually is performed.

In step F104, the range of x: xmin<x<xmax, which has the smallest intersection number n, is searched for in the vicinity of the rotation center RC while moving the first slider 7.

Then, the position of the first slider 7 is set to the center position of the range: x=(xmin+xmax)/2.

This operation will be described with reference to FIG. 10.

Figure 10:
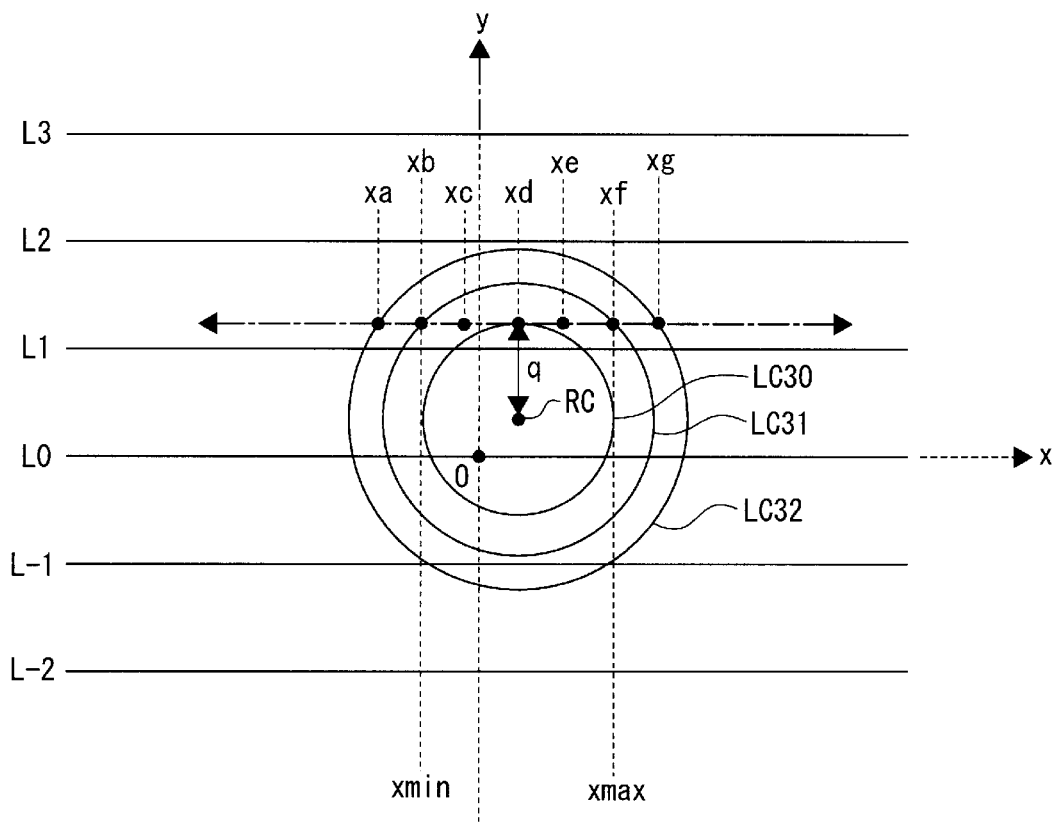
FIG. 10 is an explanatory diagram for the adjustment of misalignment according to the embodiment of the present disclosure in an x-direction.

The rotation center RC of the reference medium 102R is located at the position shown in FIG. 10. It should be noted that the origin O is also shown in FIG. 10.

At this point, the adjustment in the y-direction is not yet performed. The center position of the irradiation spot of laser light is displaced from the rotation center RC by an arrow q in the y-direction.

If the first slider 7 is moved in the x-direction in this state, the center position of the irradiation spot of laser light moves along the alternate long and short dash line shown in FIG. 10. It should be noted that although the alternate long and short dash line is shown to be parallel to the straight lines L, the reference medium 102R (that is, the straight lines L) is rotated.

In step F104, the intersection number n is confirmed at the position obtained by gradually moving the position of the first slider 7 in the x-direction. An xa to an xg shown in FIG. 10 are x-coordinate values of the first slider 7.

If the first slider 7 is moved to the coordinate where x=xa, laser light is applied to the rotating reference medium 102R along a spot movement locus LC32 shown in FIG. 10. In this case, the intersection number n is 6.

Moreover, in the state where the first slider 7 is moved to the coordinate where x=xb, a spot movement locus LC31 is obtained. In this case, the intersection number n is 4.

As described above, the intersection number n is confirmed while sequentially moving the first slider 7 in the x-direction.

In the case of FIG. 10, if the position of the first slider 7 is located at the xb, xc, xd, xe, or xf, the intersection number n is 4.

On the other hand, as the position of the first slider 7 is located at a position more left than the xa or more right than the xg in FIG. 10, the intersection number n increases.

Because the adjustment in the y-direction is not yet performed at this point, the minimum value of the intersection number n is not necessarily zero. For example, in the case of FIG. 10, the minimum value of the intersection number n is 4.

In step F104, the intersection number n is confirmed while moving the first slider 7 as described above, and the range of x: xmin<x<xmax, which has the smallest intersection number n, is searched for. In this case, xmin=xb and xmax=xf.

Then, the position of the first slider 7 in the x-direction is set to the center position of the range: x=(xmin+xmax)/2, which represents that the first slider 7 is located at the position of the x-coordinate value of the rotation center RC.

Thus, the position of the first slider 7 at which the amount of misalignment in the x-direction is zero (ideally zero) is obtained.

Next, the adjustment in the y-direction is performed in step F105.

Specifically, the second slider 15 is moved, and the range of y: ymin<y<ymax, which has the smallest intersection number n is searched for. This is the same operation as that in the adjustment in the x-direction.

Then, if the positions of ymin and ymax are found, the position in the y-direction is set to the center position of the range: y=(ymin+ymax)/2.

Thus, the position of the second slider 15 at which the amount of misalignment in the y-direction is zero (ideally zero) is obtained.

The adjustment in the y-direction is performed in step F105, and then the intersection number n is confirmed in step F106. Then, in step F107, whether or not the intersection number n is zero is determined.

Because the adjustment in the x-direction is performed in step F104 and the adjustment in the y-direction is performed in step F105, the intersection number n monitored at the point of step F105 is normally zero.

However, the intersection number n is not zero in some cases due to various factors as described in Japanese Patent Application Laid-open No. 2009-129513, for example.

In this regard, in the case where the intersection number n is not zero in step F107, the process proceeds to step F108 depending on the state and starts from the mounting of the reference medium 102R.

If the intersection number n=0 in step F107, the center position of the irradiation spot of laser light is aligned with the rotation center RC (within the allowable error range).

In this case, the process proceeds from step F107 to step F109, and the original positions of the first slider 7 (x-direction) and the second slider 15 (y-direction) are adjusted. Specifically, the original position of the first slider 7 is set to the position in the x-direction adjusted in step F104 and the original position of the second slider 15 is set to the position in the y-direction adjusted in step F105.

Thus, the adjustment of misalignment is completed.

Figure 11A:
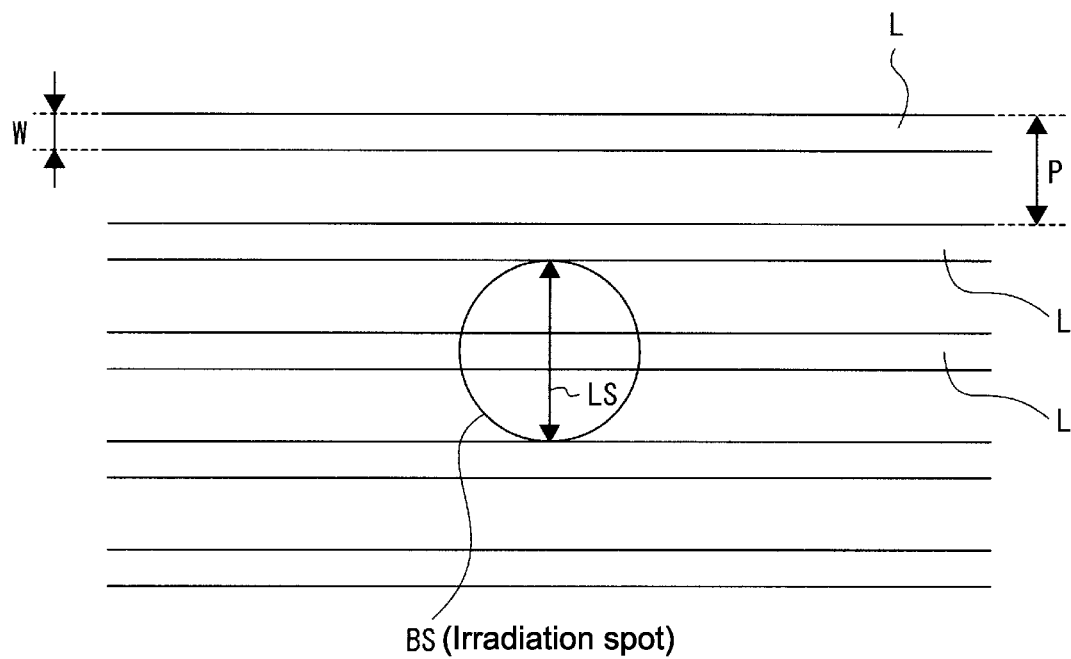
FIGS. 11A and 11B are each an explanatory diagram for the conditions of relationships between the diameter of the irradiation spot formed on the reference medium and the width and pitch of parallel straight lines.

Here, in the above, the method of adjusting the misalignment has been conceptually described with only the center position of the irradiation position of laser light and the straight lines L as simple lines. However, as shown in FIG. 11A, the laser light has a certain diameter LS as an irradiation spot BS and the straight lines L have a certain width w, actually.

In this example, the diameter LS of the irradiation spot BS formed on the reference medium 102R is 500 nm, which is the same as that of BD (Blu-ray Disc: registered trademark).

Moreover, the width w of the straight lines L is 100 nm and the pitch p is set to 300 nm.

Specifically, in this example, the relationships between the diameter LS, the width w, and the pitch p satisfy the conditions that LS=2p−2w.

Figure 11B:
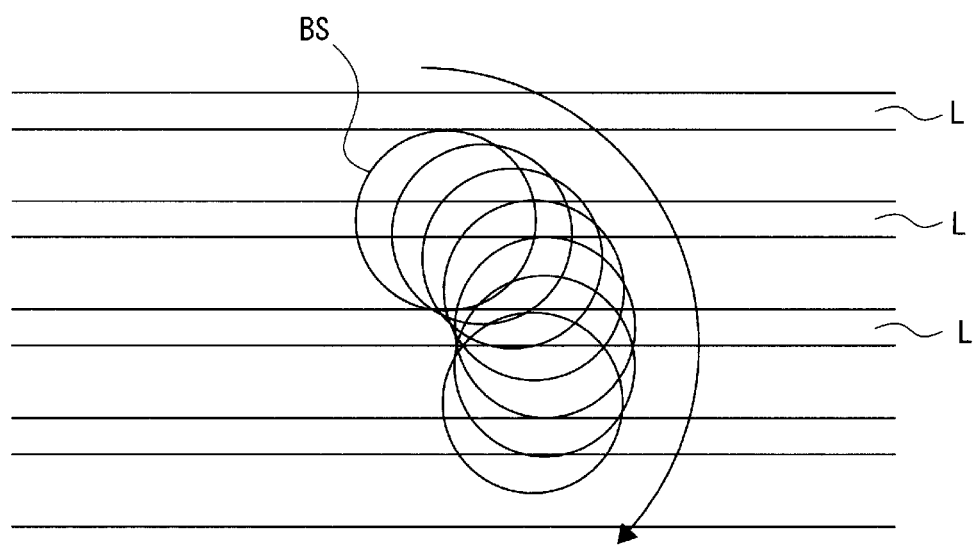

FIG. 11B schematically shows a state where the irradiation spot BS passes across the plurality of straight lines L due to the misalignment in the above-mentioned adjustment method according to this example in the case where the conditions that LS=2p−2w are satisfied.

With reference to FIG. 11B, it can be seen that a state where only one straight line L is in the irradiation spot BS can be obtained in the process in which the irradiation spot BS passes across the plurality of straight lines L due to the misalignment in the case where the conditions that LS=2p−2w are satisfied. In the parallel line drawn area 110, the maximum amount of reflected light can be obtained in the state where only one straight line L is in the irradiation spot BS. Then, as the reference medium 102R is rotated more from the state, the amount of reflected light gradually decreases because a part of adjacent straight line L is in the irradiation spot BS. The smallest amount of reflected light is obtained when two straight lines L are in the irradiation spot BS. As the reference medium 102R is rotated more, the number of straight lines L in the irradiation spot BS is gradually changed from 2 to 1, and the amount of reflected light is gradually changed from the minimum to the maximum.

As is understood from the above, it is possible to detect that the laser light passes across the straight line L (intersection point of the laser light and the straight line L) by monitoring the change of the amount of reflected light also in the actual conditions that the irradiation spot BS has the diameter LS and the straight lines L have the width w.

Here, the conditions that LS=2p−2w are only an example. For example, LS<2p−2w. Under the conditions that LS=2p−2w shown in FIG. 11B, in the state where the center of the irradiation spot BS is aligned with the center of the straight line L (referred to as straight line Ln), i.e., at the intersection point of the irradiation spot BS and the straight line Ln, the marginal part of the irradiation spot BS is brought into contact with the marginal parts of straight lines Ln+1 and Ln−1 adjacent to the straight line Ln. If LS<2p−2w, it is possible to make enough space between the marginal part of the irradiation spot BS and the marginal parts of straight lines Ln+1 and Ln−1 at the intersection point of the irradiation spot BS and the straight line Ln.

Here, it is difficult to make the respective straight lines L a proper straight line actually, and some degree of distortion is produced. Taking into account this, in the case where LS=2p−2w, the number of straight lines L in the irradiation spot BS at the intersection point is one or more in some cases, and thus the amount of reflected light (maximum amount of reflected light) at the intersection point decreases. Specifically, the difference between the maximum amount of reflected light and the minimum amount of reflected light (state where two straight liens L are in the irradiation spot BS) decreases, which results in the decrease in detection accuracy of the intersection point. On the other hand, if LS<2p−2w, the number of straight lines L in the irradiation spot BS at the intersection point is one even if the distortion of the straight line L is produced. Therefore, it is possible to prevent the difference between the maximum amount of reflected light and the minimum amount of reflected light from decreasing, and the detection accuracy of the intersection point from decreasing.

It should be noted that the relationships between the diameter LS, the width w, and the pitch p for detecting the intersection point of the laser light and the straight line L should satisfy the conditions that LS<2p−w at least.

Figure 12A:
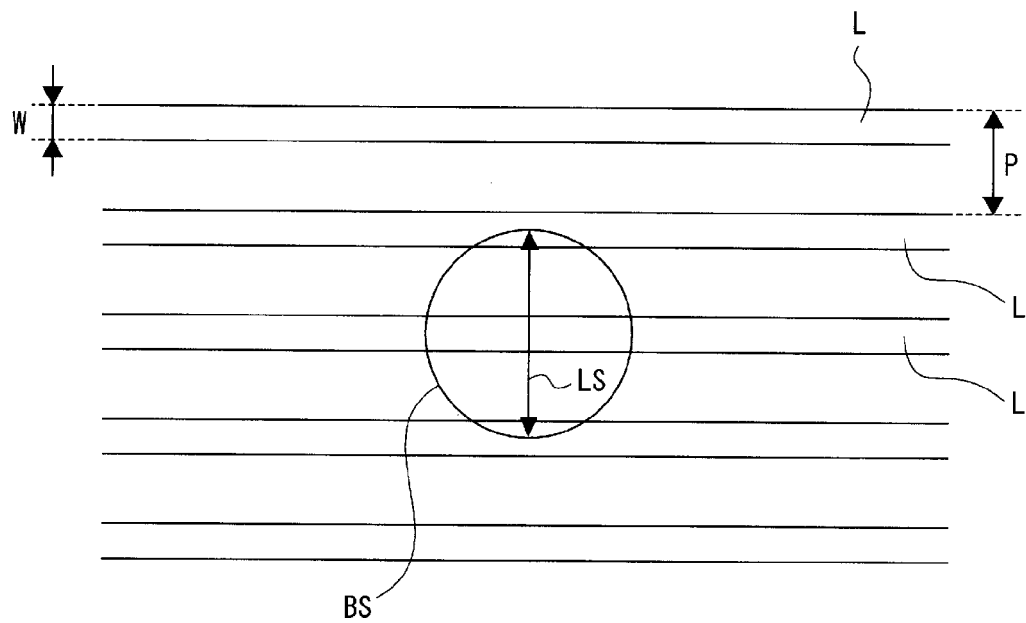
FIGS. 12A and 12B are each an explanatory diagram for the conditions of a relationship between the diameter of the irradiation spot formed on the reference medium and the width and pitch of parallel straight lines similarly to FIGS. 11A and 11B.
Figure 12B:
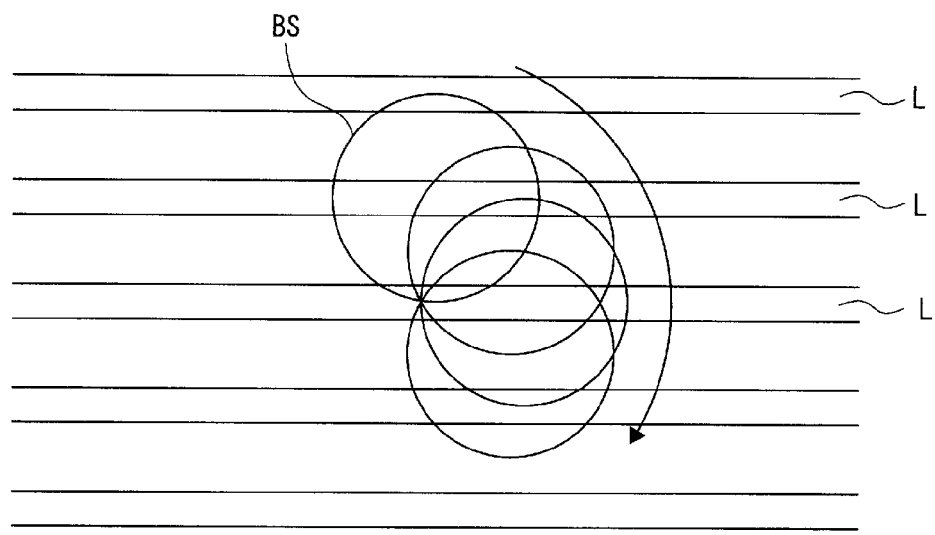
Figure 14A:
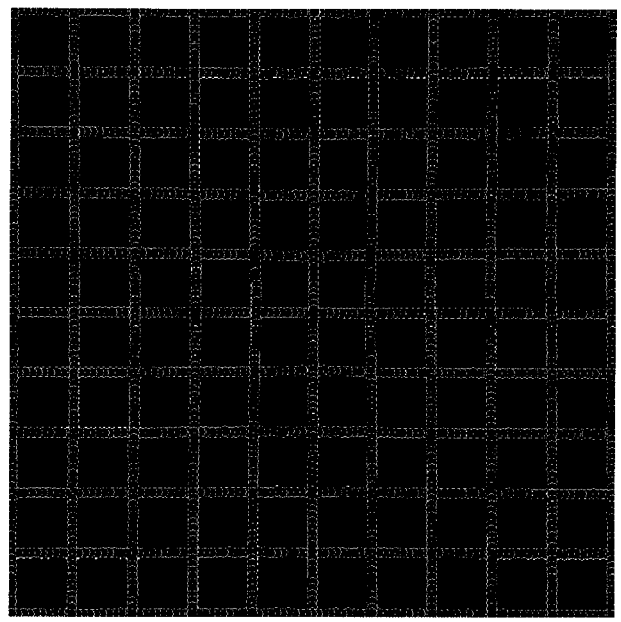
FIGS. 14A and 14B are each a diagram showing the simulation results of a relationship between the misalignment and the distortion of the concavo-convex pattern (in the case where x=−50 nm and y=0 nm, and where x=−100 nm and y=0 nm)
Figure 14B:
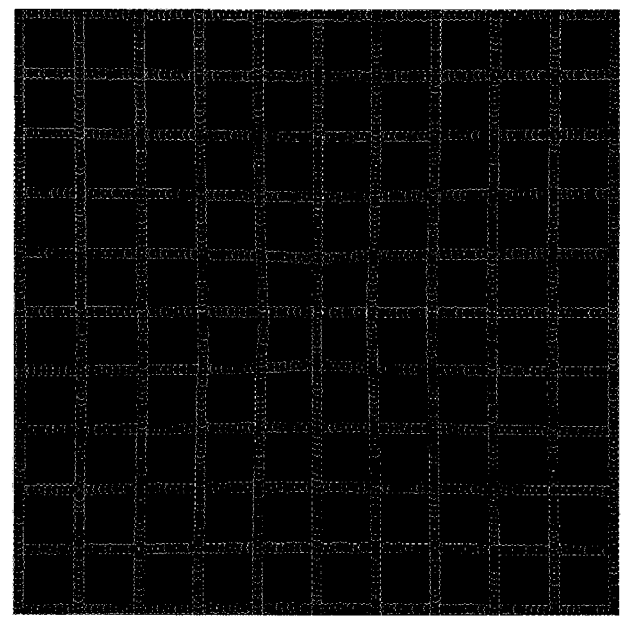
Figure 15A:
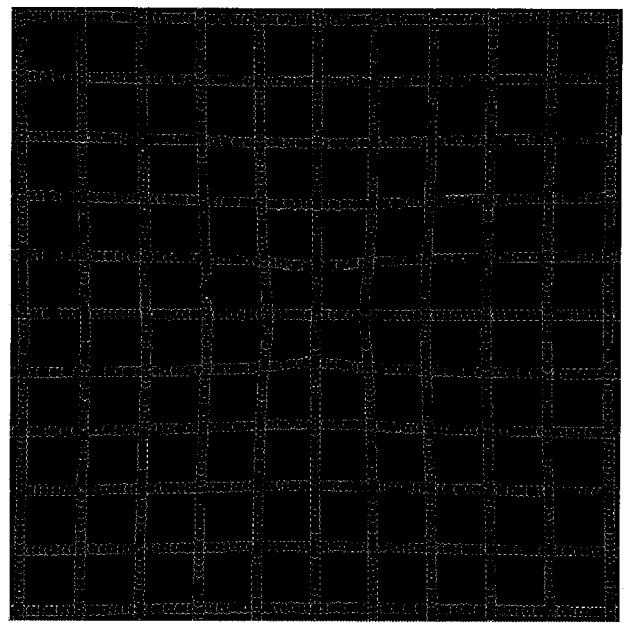
FIGS. 15A and 15B are each a diagram showing the simulation results of a relationship between the misalignment and the distortion of the concavo-convex pattern (in the case where x=−200 nm and y=0 nm, and where x=−500 nm and y=0 nm)
Figure 15B:
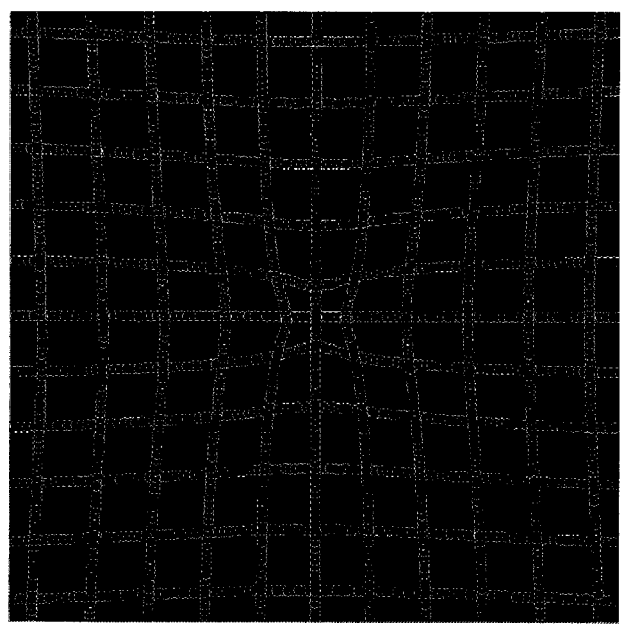
Figure 16A:
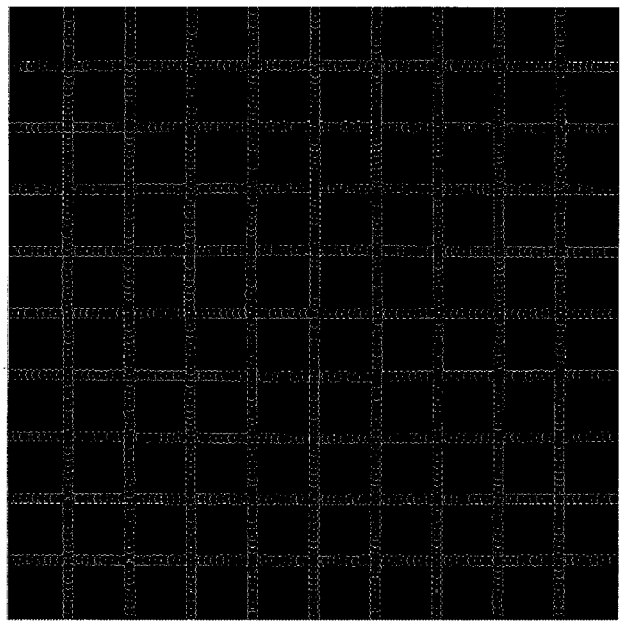
FIGS. 16A and 16B are each a diagram showing the simulation results of a relationship between the misalignment and the distortion of the concavo-convex pattern (in the case where x=+50 nm and y=0 nm, and where x=+100 nm and y=0 nm)
Figure 16B:
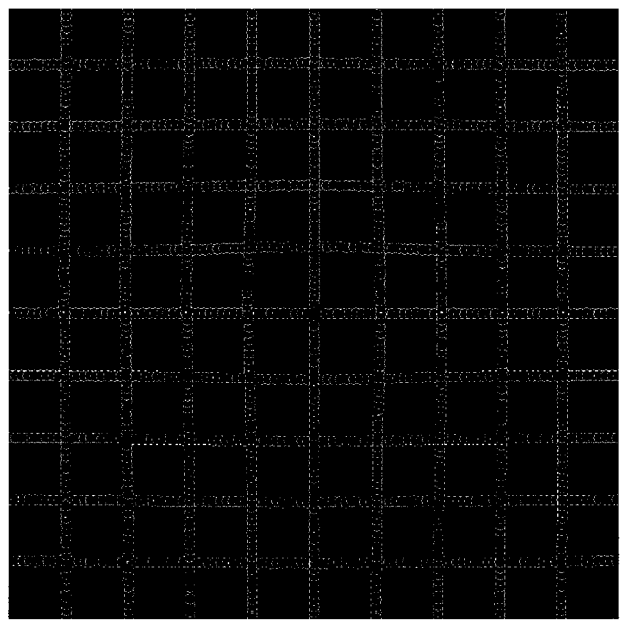

FIG. 12A shows the relationship between the plurality of straight lines L on the reference medium 102R and the irradiation spot BS in the case where LS=2p−w, and FIG. 12B schematically shows the state where the irradiation spot BS passes across the plurality of straight lines L due to the misalignment in the above-mentioned adjusting method according to this example in the case where LS=2p−w.

With reference to FIG. 12B, it can be seen that two straight lines L are in the irradiation spot BS in the process in which the irradiation spot BS passes across the plurality of straight lines L due to the misalignment in the case where LS=2p−w. Therefore, even if the irradiation spot BS passes across the plurality of straight lines L due to the misalignment, the amount of reflected light is not changed, and it may be impossible to detect the intersection point of the laser light and the straight line L.

In view of the above, in order to monitor the waveform of reflected light and detect the intersection point of the laser light and the straight line L, the conditions that LS<2p−w should be satisfied at least.

(4-3. Regarding Allowable Amount of Misalignment)

FIGS. 13, 14A, 14B, 15A, 15B, 16A, 16B, 17A, 17B, 18A, 18B, 19A, 19B, 20A, and 20B each show the simulation results of a relationship between the misalignment and the distortion of the concavo-convex pattern.

It should be noted that FIGS. 13, 14A, 14B, 15A, 15B, 16A, 16B, 17A, 17B, 18A, 18B, 19A, 19B, 20A, and 20B each show the results of forming a pattern having a lattice shape by the rotation recording with the minimum dot size of 160 nm and the spiral pitch of 20 nm. In this case, the respective lines forming the lattice have a width of 160 nm, which is the same as the minimum dot size.

In FIGS. 13, 14A, 14B, 15A, 15B, 16A, 16B, 17A, 17B, 18A, 18B, 19A, 19B, 20A, and 20B, the vertical direction of the plane of paper is the x-direction and the horizontal direction is the y-direction (see FIG. 13). The slide direction during recording is the +x-direction (downward direction of the plane of paper). It should be noted that the relationships between the −x-direction, +y-direction, and −y-direction based on the +x-direction serving as a reference are as shown in FIG. 4.

First, in the case of no misalignment shown in FIG. 13, no distortion is produced on the concavo-convex pattern.

Figure 17A:
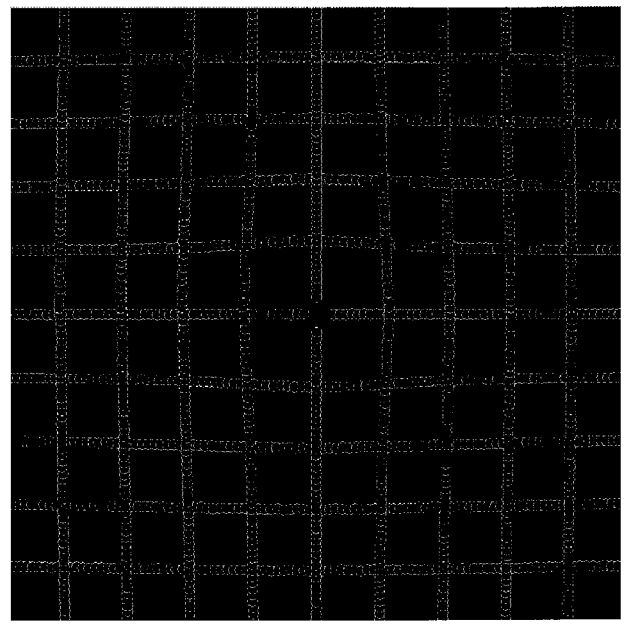
FIGS. 17A and 17B are each a diagram showing the simulation results of a relationship between the misalignment and the distortion of the concavo-convex pattern (in the case where x=+200 nm and y=0 nm, and where x=+500 nm and y=0 nm)
Figure 17B:
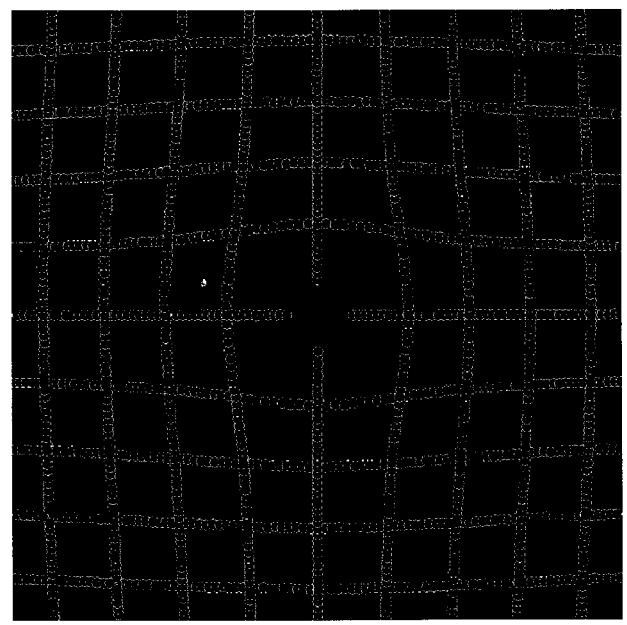

FIGS. 14A, 14B, 15A, 15B, 16A, 16B, 17A, and 17B each show the pattern formed when the amount of misalignment satisfies the conditions that x=−50 nm and y=0 nm (FIG. 14A), x=−100 nm and y=0 nm (FIG. 14B), x=−200 nm and y=0 nm (FIG. 15A), x=−500 nm and y=0 nm (FIG. 15B), x=+50 nm and y=0 nm (FIG. 16A), x=+100 nm and y=0 nm (FIG. 16B), x=+200 nm and y=0 nm (FIG. 17A), and x=+500 nm and y=0 nm (FIG. 17B).

According to the results shown in FIGS. 14A, 14B, 15A, 15B, 16A, 16B, 17A, and 17B, the distortion of the pattern is almost zero in the misalignment of ±50 nm in the x-direction, and some distortion is monitored in the misalignment of about ±100 nm in the x-direction. Obviously large distortion is produced in the misalignment of about ±200 nm in the x-direction, and larger distortion is produced, which breaks the pattern, in the misalignment of about ±500 nm in the x-direction Moreover, FIGS. 18A, 18B, 19A, and 19B each show the pattern formed when the amount of misalignment satisfies the conditions that x=0 nm and y=50 nm (FIG. 18A), x=0 nm and y=100 nm (FIG. 18B), x=0 nm and y=200 nm (FIG. 19A), and x=0 nm and y=500 nm (FIG. 19B).

It should be noted that the distortion of the pattern produced due to the misalignment in the −y-direction is symmetrical to that produced due to the misalignment in the +y-direction with respect to the center of rotation, and the amount of distortion in the −y-direction is equivalent to that in the +y-direction. Therefore, illustration of the pattern in the misalignment in the −y-direction is omitted.

In view of the above, with reference to the results shown in FIGS. 18A, 18B, 19A, and 19B, some distortion is monitored in the case of ±50 nm and obviously large distortion is monitored in the case of ±100 nm in the misalignment in the y-direction. Obviously larger distortion is produced in the case of ±200 nm, and the pattern is broken. The pattern is further distorted in the case of ±500 nm.

Here, according to the results shown in FIGS. 14A, 14B, 15A, 15B, 16A, 16B, 17A, 17B, 18A, 18B, 19A, and 19B, it can be seen that the distortion of the pattern in the misalignment in the y-direction is about twice larger than that in the x-direction. This is because the rotation recording is performed.

Figure 19A:
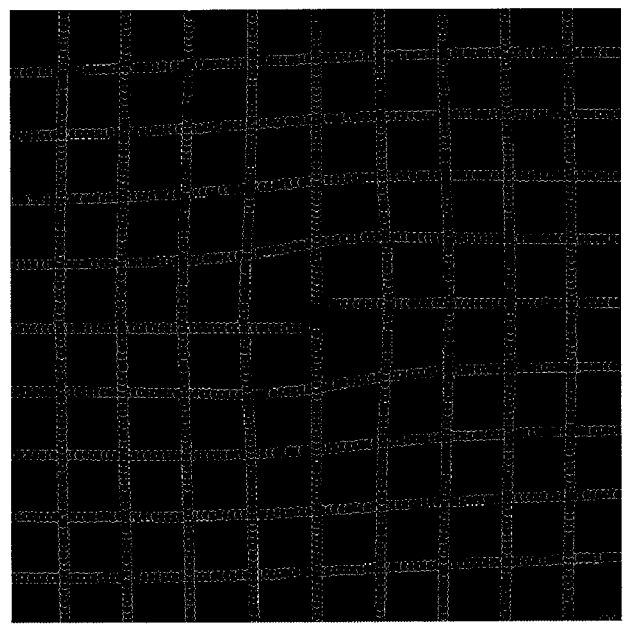
FIGS. 19A and 19B are each a diagram showing the simulation results of a relationship between the misalignment and the distortion of the concavo-convex pattern (in the case where x=0 nm and y=200 nm, and where x=0 nm and y=500 nm)

With reference to FIGS. 19A and 19B, it can be confirmed that the displacement of the lines forming a lattice is produced at the top and bottom of the plane of paper (in the +x-direction and the −x-direction) around the center of rotation in the misalignment in the y-direction.

Figure 20A:
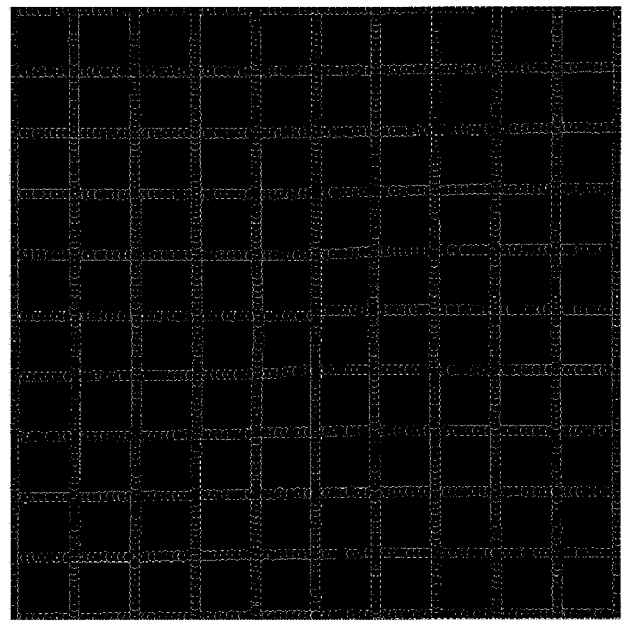
FIGS. 20A and 20B are each a diagram showing the simulation results of a relationship between the misalignment and the distortion of the concavo-convex pattern (in the case where x=−100 nm and y=50 nm, and where x=+100 nm and y=50 nm).
Figure 20B:
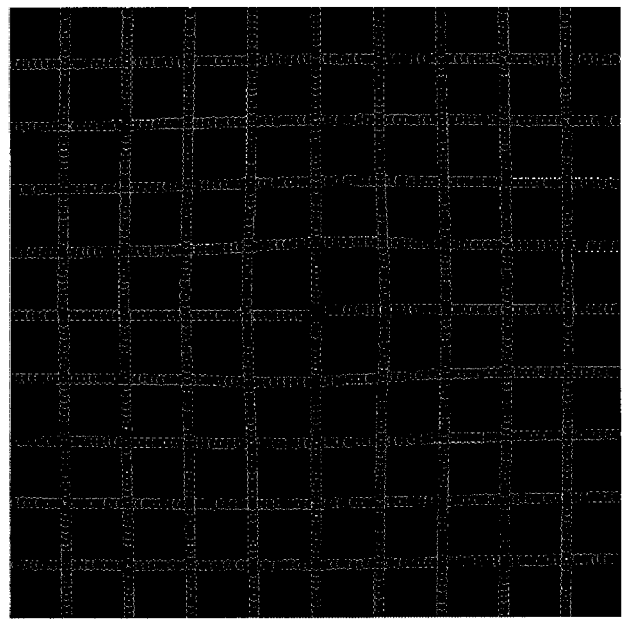

FIGS. 20A and 20B show the patterns formed when the misalignment satisfies the conditions that x=−100 nm and y=50 nm (FIG. 20A) and where x=+100 nm and y=50 nm (FIG. 20B) as an example in which the misalignment occurs in the x-direction and the y-direction simultaneously.

Figure 18A:
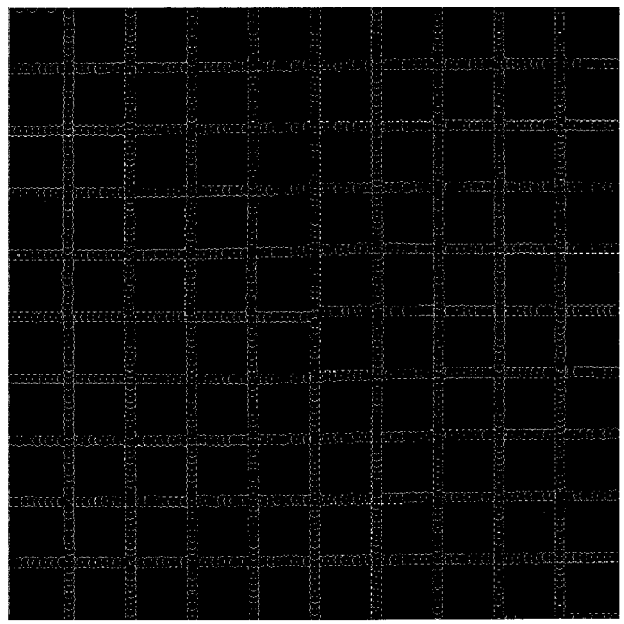
FIGS. 18A and 18B are each a diagram showing the simulation results of a relationship between the misalignment and the distortion of the concavo-convex pattern (in the case where x=0 nm and y=50 nm, and where x=0 nm and y=100 nm)
Figure 18B:
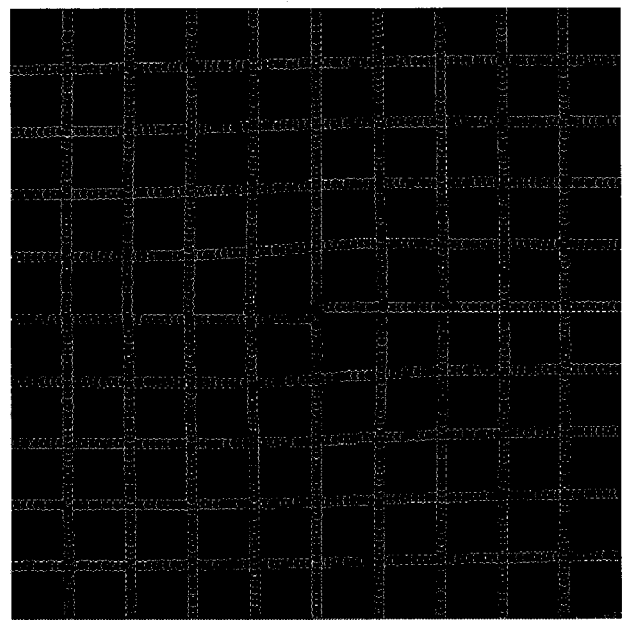
Figure 19B:
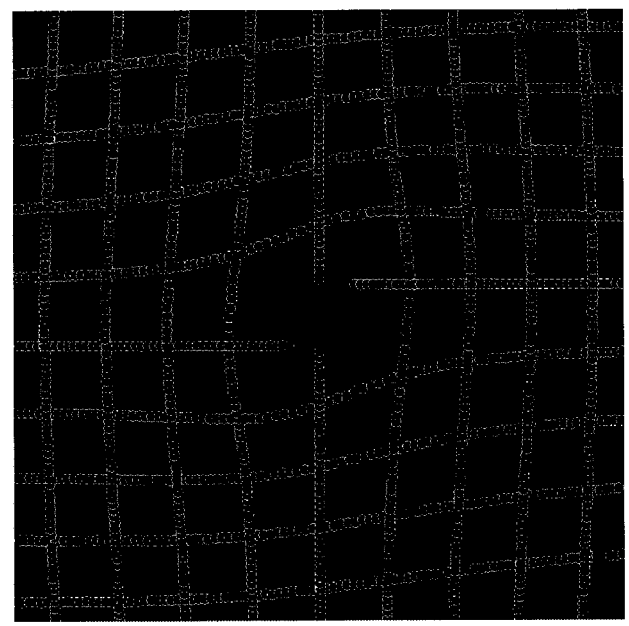

According to FIGS. 20A and 20B, it can be seen that even if the misalignment occurs in the x-direction and the y-direction simultaneously, the magnitude of the distortion of the pattern is about the same as that in the x-direction (FIGS. 14B and 16B) and that in the y-direction (FIG. 18B).

According to the results shown in FIGS. 13, 14A, 14B, 15A, 15B, 16A, 16B, 17A, 17B, 18A, 18B, 19A, 19B, 20A, and 20B, it is desirable that the amount of misalignment in the x-direction is less than 100 nm and the amount of misalignment in the y-direction is less than 50 nm in order to prevent the pattern from being distorted substantially.

It should be noted that the allowable amount of distortion of the pattern depends on the minimum width of the concavo-convex pattern to be formed, i.e., the minimum dot size. Specifically, if the minimum dot size is large, the distortion of the pattern may be large. On the other hand, if the minimum dot size is small, the amount of distortion of the pattern is expected to be low.

In view of the above, in this embodiment, the allowable amount of misalignment is defined based on the minimum dot size.

According to the simulation results, the amount of misalignment only has to be less than one-half of the minimum dot size (less than 80 nm under the setting conditions of the simulation) in the x-direction and one-quarter of the minimum dot size (less than 40 nm under the conditions) in the y-direction.

The recording apparatus 3 according to this embodiment is configured to perform recording in the master 102 after the amount of misalignment in the x-direction and the y-direction is adjusted so that such conditions of the allowable amount are satisfied. Accordingly, it is possible to substantially prevent the concavo-convex pattern formed on the finally obtained replicated medium 108 form being distorted.

According to the adjustment of the misalignment as the above-mentioned embodiment, it is possible to adjust the misalignment so that the conditions of the allowable amount are satisfied as is understood from the adjustment of the conditions that x=(xmin+xmax)/2 and y=(ymin+ymax)/2.

It should be noted that it may be impossible to make the amount of misalignment completely zero by the adjustment of misalignment with consideration of, for example, the influence of production accuracy of the parallel line drawn area 110 of the reference medium 102R actually.

Therefore, the concavo-convex pattern formed on the replicated medium 108 serving as a pattern forming medium is symmetrically distorted around the center of rotation during rotation recording.

5. Summary

As described above, in this embodiment, an recording operation in which the position of the irradiation spot of laser light is changed in the first direction while rotating the recording layer forming medium and applying the laser light to the recording layer formed on the recording layer forming medium is performed, thereby forming a predetermined pattern in consecutive areas including a central portion of the recording layer.

Because recording is performed in the consecutive areas including a central portion of the recording layer, limitation of the size of the replicated medium 108 serving as a final product or the number of divisions is not imposed if the replicated medium 108 is divided into pieces and is commercialized.

Therefore, it is favorable for manufacturing products other than the optical disc product as a pattern forming medium in which a concavo-convex pattern is formed.

Moreover, in this embodiment, in the recording apparatus 3, the second slide mechanism is provided that changes the position of the irradiation spot of laser light in the second direction perpendicular to the first direction.

The second slide mechanism is capable of changing the position of the irradiation spot in the second direction perpendicular to the first direction being the slide direction at the time of recording. Therefore, it is possible to adjust the misalignment not only in the first direction but also the second direction.

Furthermore, in this embodiment, the recording operation is performed after the misalignment is adjusted in the first direction and the second direction.

By adjusting the misalignment as described above, it is possible to prevent the concavo-convex pattern from being distorted.

Furthermore, in this embodiment, the recording operation is performed in the state where the misalignment is adjusted so that the amount of misalignment in the first direction is less than one-half of the minimum dot size and the amount of misalignment in the second direction is less than one-quarter of the minimum dot size.

Accordingly, it is possible to suppress the distortion of the concavo-convex pattern within the allowable range, and to substantially prevent the concavo-convex pattern from being distorted.

In addition, in this embodiment, the misalignment is adjusted using a reference medium in which a predetermined number of straight lines by which a variation of reflected light can be monitored when laser light is applied are formed in parallel with each other at regular intervals.

Such a reference medium is suitable for the adjustment of misalignment, and it is possible to adjust the misalignment efficiently by using the reference medium.

Moreover, in this embodiment, the misalignment is adjusted by applying the laser light with reproduction power in a state where the reference medium is rotated and monitoring return light of the laser light applied with the reproduction power so that the number of the straight lines across which the laser light passes is zero.

The laser light passes across the straight lines, which represents that the misalignment occurs. Therefore, by making the number of the straight lines across which the laser light passes zero as described above, it is possible to properly adjust the misalignment.

Furthermore, in this embodiment, the width w of the respective straight lines L, the pitch p being a formation pitch of the respective straight lines L, and the diameter LS of the irradiation spot of laser light satisfy the conditions that LS<2p−w.

Accordingly, it is possible to change the amount of return light even if the misalignment occurs and to adjust the misalignment so that the number of the straight lines across which the laser light passes is zero as described above.

Furthermore, in this embodiment, the conditions that LS<2p−2w is satisfied.

Accordingly, the change of the amount of return light in the case where the misalignment occurs is clarified, and it is possible to prevent the detection accuracy of the intersection point of the laser light and the straight line from decreasing.

Moreover, in the pattern forming medium according to this embodiment, the concavo-convex pattern based on rotation recording is formed on consecutive areas including the central portion of the forming surface of the concavo-convex pattern.

Since the concavo-convex pattern is formed in the consecutive areas including the central portion, the limitation of the size of the product or the number of divisions is not imposed. Therefore, it is favorable as products other than the optical disc, in which the concavo-convex pattern is formed based on rotation recording.

6. Modified Example

Although the embodiment according to the present disclosure has been described, the present disclosure is not limited to the specific examples described above, and various modified examples can be applied.

For example, in the above description, an example in which the pattern-formed master 105 is produced from the master 102 (the recorded master 104) recorded by the recording apparatus 3, the stamper 106 is produced from the pattern-formed master 105, and then the replicated medium 108 made of resin is manufactured from the stamper 106 as a product (or, the replicated medium 108 is divided into pieces and is manufactured as a product) is shown. In this case, the master 102 corresponds to the "recording layer forming medium" according to this embodiment, and the replicated medium 108 corresponds to the "pattern forming medium."

However, the pattern forming medium according to this embodiment is not limited to the one replicated from the stamper 106 as described above, and corresponds to the pattern-formed master 105 in which the concavo-convex pattern is formed based on the recording operation of the recording apparatus 3 in some cases. For example, a wiring pattern on a semiconductor substrate is formed by the recording operation according to this embodiment. In this case, the recording operation according to this embodiment is performed on a medium in which a resist layer is formed on the semiconductor substrate (corresponding to the recording layer forming medium), and thus the medium thus obtained in which a necessary concavo-convex pattern is formed is a pattern forming medium as a product.

Moreover, the method of adjusting the misalignment is only an example, it is possible to adjust the misalignment by another method.

For example, the adjustment method using a reference medium in which parallel lines are formed at regular intervals is not limited to the method exemplified above.

Alternatively, the adjustment method using no reference medium can be adopted.

Moreover, in the above, an example in which the position of the irradiation spot of laser light is changed in the first direction and the second direction perpendicular to the first direction has been described. At this time, the second direction is not necessarily perpendicular to the first direction strictly, and some errors are acceptable. Specifically, the second direction only has to be different from the first direction.

7. Present Disclosure

The present disclosure may also take the following configurations.

(1) A recording apparatus, including:
a rotation driving unit configured to rotate a recording layer forming medium in which a recording layer is formed;
a laser irradiation unit configured to apply laser light to the recording layer of the recording layer forming medium;
a first slide mechanism configured to change a position of an irradiation spot of the laser light on the recording layer in a first direction parallel to an in-plane direction of the recording layer; and
a recording unit configured to perform a recording operation in which the position of the irradiation spot is changed in the first direction by the first slide mechanism while applying the laser light to the recording layer by the laser irradiation unit and rotating the recording layer forming medium by the rotation driving unit, thereby recording a predetermined pattern in consecutive areas including a central portion of the recording layer.

(2) The recording apparatus according to (1), further including
a second slide mechanism configured to change the position of the irradiation spot in a second direction perpendicular to the first direction, the second direction being parallel to the in-plane direction of the recording layer.

(3) The recording apparatus according to (1) or (2), in which
in a case where a direction that is parallel to the in-plane direction of the recording layer and is perpendicular to the first direction is assumed to be a second direction and displacement between a center of rotation of the recording layer forming medium and an original recording position on the recording layer is assumed to be misalignment, the misalignment is adjusted so that an amount of the misalignment in the first direction is less than one-half of the minimum size of dots recorded on the recoding layer and an amount of the misalignment in the second direction is less than one-quarter of the minimum size of dots.

(4) A recording method, including
performing a recording operation in which a position of an irradiation spot of laser light on a recording layer formed in a recording layer forming medium is changed in a first direction parallel to an in-plane direction of the recording layer while applying the laser light to the recording layer and rotating the recording layer forming medium, thereby recording a predetermined pattern in consecutive areas including a central portion of the recording layer.

(5) The recording method according to (4), in which
in a case where a direction that is parallel to the in-plane direction of the recording layer and is perpendicular to the first direction is assumed to be a second direction and displacement between a center of rotation of the recording layer forming medium and an original recording position on the recording layer is assumed to be misalignment, the recording operation is performed after the misalignment is adjusted in the first direction and the second direction.

(6) The recording method according to (5), in which
the recording operation is performed in a state where the misalignment is adjusted so that an amount of the misalignment in the first direction is less than one-half of the minimum size of dots recorded on the recoding layer and an amount of the misalignment in the second direction is less than one-quarter of the minimum size of dots.

(7) The recording method according to (5) or (6), in which
the misalignment is adjusted using a reference medium in which a predetermined number of straight lines by which a variation of reflected light can be monitored when the laser light is applied are formed in parallel with each other at regular intervals.

(8) The recording method according to (7), in which
the adjustment is performed by applying the laser light with reproduction power that is less than recording sensitivity of a material of the reference medium in a state where the reference medium is rotated and monitoring return light of the laser light applied with the reproduction power so that the number of the straight lines across which the laser light passes is zero.

(9) The recording method according to (8), in which
in a case where a width of the straight line is assumed to be w, a formation pitch of the straight line is assumed to be p, and a diameter of an irradiation spot of the laser light formed on the reference medium is assumed to be LS, a condition that LS is smaller than 2p−w is satisfied.

(10) The recording method according to (9), in which
a condition that LS is smaller than 2p−2w is satisfied.

(11) A pattern forming medium, including
a concavo-convex pattern based on rotation recording formed in consecutive areas including a central portion of a forming surface of the concavo-convex pattern.

(12) The pattern forming medium according to (11), in which
symmetrical distortion is produced on the concavo-convex pattern based on a center of rotation during the rotation recording.

It should be understood by those skilled in the art that various modifications, combinations, sub-combinations and alterations may occur depending on design requirements and other factors insofar as they are within the scope of the appended claims or the equivalents thereof.

What is claimed is:
1. A recording apparatus, comprising:
a rotation driving unit configured to rotate a recording layer forming medium in which a recording layer is formed;
a laser irradiation unit configured to apply laser light to the recording layer of the recording layer forming medium;
a first slide mechanism configured to change a position of an irradiation spot of the laser light on the recording layer in a first direction parallel to an in-plane direction of the recording layer; and a recording unit configured to perform a recording operation in which the position of the irradiation spot is changed in the first direction by the first slide mechanism while applying the laser light to the recording layer by the laser irradiation unit and rotating the recording layer forming medium by the rotation driving unit, wherein a predetermined pattern is recorded in consecutive areas including a center of the recording layer.

2. The recording apparatus according to claim 1, further comprising a second slide mechanism configured to change the position of the irradiation spot in a second direction perpendicular to the first direction, the second direction being parallel to the in-plane direction of the recording layer.

3. The recording apparatus according to claim 1, wherein in a case where a direction that is parallel to the in-plane direction of the recording layer and is perpendicular to the first direction is assumed to be a second direction and displacement between a center of rotation of the recording layer forming medium and an original recording position on the recording layer is assumed to be misalignment, the misalignment is adjusted so that an amount of the misalignment in the first direction is less than one-half of the minimum size of dots recorded on the recoding layer and an amount of the misalignment in the second direction is less than one-quarter of the minimum size of dots.

4. A recording method, comprising:
performing a recording operation in which a position of an irradiation spot of laser light on a recording layer formed in a recording layer forming medium is changed in a first direction parallel to an in-plane direction of the recording layer while applying the laser light to the recording layer and rotating the recording layer forming medium, wherein a predetermined pattern is recorded in consecutive areas including a center of the recording layer.

5. The recording method according to claim 4, wherein in a case where a direction that is parallel to the in-plane direction of the recording layer and is perpendicular to the first direction is assumed to be a second direction and displacement between a center of rotation of the recording layer forming medium and an original recording position on the recording layer is assumed to be misalignment, the recording operation is performed after the misalignment is adjusted in the first direction and the second direction.

6. The recording method according to claim 5, wherein the recording operation is performed in a state where the misalignment is adjusted so that an amount of the misalignment in the first direction is less than one-half of the minimum size of dots recorded on the recoding layer and an amount of the misalignment in the second direction is less than one-quarter of the minimum size of dots.

7. The recording method according to claim 6, wherein the misalignment is adjusted using a reference medium in which a predetermined number of straight lines by which a variation of reflected light can be monitored when the laser light is applied are formed in parallel with each other at regular intervals.

8. The recording method according to claim 7, wherein the adjustment is performed by applying the laser light with reproduction power that is less than recording sensitivity of a material of the reference medium in a state where the reference medium is rotated and monitoring return light of the laser light applied with the reproduction power so that the number of the straight lines across which the laser light passes is zero.

9. The recording method according to claim 8, wherein in a case where a width of the straight line is assumed to be w, a formation pitch of the straight line is assumed to be p, and a diameter of an irradiation spot of the laser light formed on the reference medium is assumed to be LS, a condition that LS is smaller than 2p−w is satisfied.

10. The recording method according to claim 9, wherein a condition that LS is smaller than 2p−2w is satisfied.

11. A pattern forming medium, comprising:
a concavo-convex pattern based on rotation recording formed in consecutive areas including a center of a forming surface of the concavo-convex pattern.

12. The pattern forming medium according to claim 11, wherein symmetrical distortion is produced on the concavo-convex pattern based on a center of rotation during the rotation recording.

* * * * *